(12) United States Patent
Zhang et al.

(10) Patent No.: US 11,063,643 B2
(45) Date of Patent: Jul. 13, 2021

(54) METHOD AND DEVICE IN UE AND BASE STATION USED FOR WIRELESS COMMUNICATION

(71) Applicants: Xiaobo Zhang, Shanghai (CN); Lin Yang, Shanghai (CN)

(72) Inventors: Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 17/022,100

(22) Filed: Sep. 16, 2020

(65) Prior Publication Data
US 2021/0006306 A1 Jan. 7, 2021

Related U.S. Application Data

(63) Continuation of application No. PCT/CN2018/086087, filed on May 9, 2018.

(51) Int. Cl.
*H04W 72/04* (2009.01)
*H04B 7/0456* (2017.01)
*H04L 5/00* (2006.01)

(52) U.S. Cl.
CPC ......... *H04B 7/0456* (2013.01); *H04L 5/0053* (2013.01); *H04W 72/042* (2013.01)

(58) Field of Classification Search
CPC ........... H04W 72/042; H04W 72/0446; H04W 72/04; H04W 72/0453; H04W 4/40;
(Continued)

(56) References Cited

U.S. PATENT DOCUMENTS 9,503,171 B2 * 11/2016 Yeh, II ............ H04B 7/0478
2015/0236773 A1 * 8/2015 Kim ................ H04B 7/0452
375/295
(Continued)

FOREIGN PATENT DOCUMENTS

CN 106658751 A 5/2017
CN 107659373 A 2/2018
(Continued)

OTHER PUBLICATIONS

ISR in application PCT/CN2018/086087 dated Jan. 11, 2019.
Interdigital Inc."On LBT for Beam-Based Transmission for NR-U," 3GPP TSP RAN WG1 Meeing#2bis R1-1804885.Apr. 20, 2018(Apr, 20, 2018).

*Primary Examiner* — Eva Y Puente

(57) ABSTRACT

The present disclosure provides a method and device in UE and base station used for wireless communications. The UE receives first information, the first information being used for indicating a first precoding matrix; and transmits a first radio signal through a first antenna port group within a first time-domain resource in a first sub-band, or, drops wireless transmission through a first antenna port group within a first time-domain resource in a first sub-band. The first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s). The method helps enhance the chance of uplink channel access, thereby improving the system capacity.

20 Claims, 19 Drawing Sheets

(58) Field of Classification Search
CPC ... H04W 16/28; H04W 4/70; H04W 72/1289;
H04W 72/1268; H04W 72/046; H04W
76/27; H04W 24/10; H04W 4/027; H04B
7/0617; H04B 7/0626; H04B 17/309;
H04B 7/0413; H04B 17/318; H04B
7/0456; H04B 7/0695; H04B 7/0639;
H04B 7/06; H04B 7/0417; H04B 7/0478;
H04B 7/0691; H04L 5/0048; H04L
5/0053; H04L 5/0007; H04L 5/0051;
H04L 5/0057; H04L 5/0094; H04L 5/00;
H04L 67/10; H04L 67/12; H04L 5/001;
H04L 5/0023; H04L 5/0091; H04L
5/0055
USPC .................................................. 375/262, 295
See application file for complete search history.

(56) References Cited

U.S. PATENT DOCUMENTS

| | | | | |
|---|---|---|---|---|
| 2017/0170883 A1* | 6/2017 | Zhang | .................. | H04B 7/0486 |
| 2018/0309486 A1* | 10/2018 | Zhang | .................. | H04B 7/0486 |
| 2019/0132029 A1* | 5/2019 | Sun | ...................... | H04B 7/0695 |

FOREIGN PATENT DOCUMENTS

| | | |
|---|---|---|
| CN | 107852355 A | 3/2018 |
| CN | 107888256 A | 4/2018 |

* cited by examiner

Transmission beam of given antenna port
Reception beam employed by given energy detection Transmission beam of given antenna port
Reception beam employed by given energy detection

METHOD AND DEVICE IN UE AND BASE STATION USED FOR WIRELESS COMMUNICATION

CROSS REFERENCE TO RELATED APPLICATIONS

This application is a continuation of International Application No. PCT/CN2018/086087, filed May 9, 2018, the full disclosure of which is incorporated herein by reference.

BACKGROUND

Technical Field

The present disclosure relates to transmission methods and devices in wireless communication systems, and in particular to a communication method and device that support data transmission on Unlicensed Spectrum.

Related Art

In a traditional $3^{rd}$ Generation Partner Project (3GPP) Long-term Evolution (LTE) system, data transmission only occurs on Licensed Spectrum. However, as traffic flow began to skyrocket, particularly in some urban areas, the Licensed Spectrum may hardly meet growing demands for traffic, therefore, in Release 13 and Release 14 communications on Unlicensed Spectrum is introduced into a cellular system and used for downlink and uplink data transmissions. To ensure compatibility with other access technologies on Unlicensed Spectrum, the technique of Listen Before Talk (LBT) is adopted by Licensed Assisted Access (LAA) so as to prevent interference caused by multiple transmitters occupying a same frequency resource at the same time. The omnidirectional antenna is adopted by a transmitter in LTE system for performing LBT.

At present, technical discussions about 5G NR (New Radio Access Technology) are still in progress, which include Massive Multi-Input Multi-Output (MIMO), a new hot topic of study on next generation mobile communications. In Massive MIMO, multiple antennas form through beamforming a beam which points in a specific spatial direction to improve communication quality. In light of coverage properties brought about by beamforming, traditional LAA techniques shall be reconsidered, such as LBT-based radio signal transmission.

SUMMARY

Inventors find through researches that since beamforming will be massively applied in an NR system, how to enhance the chance of channel access and the system's capacity while preventing co-channel interferences among multiple transmitters has become a key issue that needs solving.

To address the above issue, the present disclosure provides a solution. It should be noted that the embodiments of the present disclosure and the characteristics in the embodiments may be mutually combined if no conflict is incurred.

The present disclosure provides a method in a UE for wireless communications, comprising:

receiving first information, the first information being used for indicating a first precoding matrix;

transmitting a first radio signal through a first antenna port group within a first time-domain resource in a first sub-band, or, dropping wireless transmission through a first antenna port group within a first time-domain resource in a first sub-band;

herein, the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

In one embodiment, a problem to be solved in the present disclosure is that: in NR system, the adoption of Massive MIMO in transmitting radio signals will lead to quite different interference situations in all beam directions. The interference in a specific beam direction can be more truthfully reflected by a beam-based LBT, so how to employ the beam-based LBT to enhance the chance of channel access and improve the system capacity is a key issue to be solved.

In one embodiment, the essence of the above method lies in that a first precoding matrix is a PMI, and K transmission parameter groups correspond to K beams within a limited beam coverage, which is determined by the PMI. A UE is able to perform channel listening inside the beam coverage, and is allowed to employ one of the K beams, as long as the LBT test result of the beam shows channel idleness, to transmit a first radio signal; on the contrary, when a LBT test result of any of the K beams shows that a channel is busy, the UE has to drop transmitting the first radio signal. An advantage of using the above method is that the number of channel access occasions is increased to K compared with just one time of channel access in traditional techniques, in which a PMI indicated by a base station is directly employed for uplink radio signal transmission, thereby enhancing the chance of access to uplink channel and further improving system capacity.

According to one aspect of the present disclosure, the above method is characterized in that the first precoding matrix is for M1 antenna ports, while each of the K transmission parameter groups is for M antenna ports, M being a positive integer greater than 1, and M1 being a positive integer greater than 1, and the M1 is no greater than the M.

According to one aspect of the present disclosure, the above method is characterized in comprising:

performing K1 access detection(s) on the first sub-band, K1 being a positive integer no greater than the K;

herein, K1 transmission parameter group(s) of the K transmission parameter groups is(are) respectively used for the K1 access detection(s), and the first transmission parameter group is one of the K1 transmission parameter group(s); the K1 access detection(s) is(are) respectively used for determining whether wireless transmission can be performed via a corresponding transmission parameter group within a first time-domain resource in the first sub-band.

According to one aspect of the present disclosure, the above method is characterized in that the UE transmits the first radio signal through the first antenna port group within the first time-domain resource in the first sub-band; the K1 is greater than 1, and the K1 access detections are used for determining the first transmission parameter group out of the K1 transmission parameter groups.

According to one aspect of the present disclosure, the above method is characterized in that the UE drops wireless transmission through the first antenna port group within the first time-domain resource in the first sub-band; the K1 is equal to the K, and each of the K1 access detections indicates that wireless transmission cannot be performed through a corresponding transmission parameter group within the first time-domain resource in the first sub-band.

According to one aspect of the present disclosure, the above method is characterized in that the UE autonomously determines the K transmission parameter groups based on the first precoding matrix.

According to one aspect of the present disclosure, the above method is characterized in that the first precoding matrix corresponds to K precoding matrixes, and the K precoding matrixes are used for determining the K transmission parameter groups, the K precoding matrixes being pre-defined or configurable.

According to one aspect of the present disclosure, the above method is characterized in comprising:

receiving second information; and transmitting a first reference signal through M2 antenna port(s);

herein, the second information is used for indicating a time-domain resource occupied by the first reference signal, the first reference signal being used for determining the first precoding matrix, M2 being a positive integer no greater than the M.

According to one aspect of the present disclosure, the above method is characterized in comprising:

receiving third information;

herein, the third information is used for indicating configuration information of the first radio signal.

The present disclosure provides a method in a base station for wireless communications, comprising:

transmitting first information, the first information being used for indicating a first precoding matrix; and monitoring whether a first radio signal is transmitted within a first time-domain resource in a first sub-band; if yes, the first radio signal is received through a first antenna port group within the first time-domain resource in the first sub-band;

herein, the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

According to one aspect of the present disclosure, the above method is characterized in that the first precoding matrix is for M1 antenna ports, while each of the K transmission parameter groups is for M antenna ports, M being a positive integer greater than 1, and M1 being a positive integer greater than 1, and the M1 is no greater than the M.

According to one aspect of the present disclosure, the above method is characterized in that a receiver of the first information performs K1 access detection(s) on the first sub-band, K1 being a positive integer no greater than the K; K1 transmission parameter group(s) of the K transmission parameter groups is(are) respectively used for the K1 access detection(s), and the first transmission parameter group is one of the K1 transmission parameter group(s); the K1 access detection(s) is(are) respectively used for determining whether wireless transmission can be performed via a corresponding transmission parameter group within a first time-domain resource in the first sub-band.

According to one aspect of the present disclosure, the above method is characterized in that a receiver of the first information transmits the first radio signal through the first antenna port group within the first time-domain resource in the first sub-band; the K1 is greater than 1, and the K1 access detections are used for determining the first transmission parameter group out of the K1 transmission parameter groups.

According to one aspect of the present disclosure, the above method is characterized in that a receiver of the first information drops wireless transmission through the first antenna port group within the first time-domain resource in the first sub-band; the K1 is equal to the K, and each of the K1 access detections indicates that wireless transmission cannot be performed through a corresponding transmission parameter group within the first time-domain resource in the first sub-band.

According to one aspect of the present disclosure, the above method is characterized in that a receiver of the first information autonomously determines the K transmission parameter groups based on the first precoding matrix.

According to one aspect of the present disclosure, the above method is characterized in that the first precoding matrix corresponds to K precoding matrixes, and the K precoding matrixes are used for determining the K transmission parameter groups, the K precoding matrixes being pre-defined or configurable.

According to one aspect of the present disclosure, the above method is characterized in comprising:

transmitting second information; and receiving a first reference signal through M2 antenna port(s);

herein, the second information is used for indicating a time-domain resource occupied by the first reference signal, the first reference signal being used for determining the first precoding matrix, M2 being a positive integer no greater than the M.

According to one aspect of the present disclosure, the above method is characterized in comprising:

transmitting third information;

herein, the third information is used for indicating configuration information of the first radio signal.

The present disclosure provides a UE for wireless communications, comprising:

a first receiver, which receives first information, the first information being used for indicating a first precoding matrix; and a first transmitter, which transmits a first radio signal through a first antenna port group within a first time-domain resource in a first sub-band, or, which drops wireless transmission through a first antenna port group within a first time-domain resource in a first sub-band;

herein, the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

In one embodiment, the above UE is characterized in that the first precoding matrix is for M1 antenna ports, while each of the K transmission parameter groups is for M antenna ports, M being a positive integer greater than 1, and M1 being a positive integer greater than 1, and the M1 is no greater than the M.

In one embodiment, the above UE is characterized in that the first receiver also performs K1 access detection(s) on the first sub-band, K1 being a positive integer no greater than the K; herein, K1 transmission parameter group(s) of the K transmission parameter groups is(are) respectively used for the K1 access detection(s), and the first transmission parameter group is one of the K1 transmission parameter group(s);

the K1 access detection(s) is(are) respectively used for determining whether wireless transmission can be performed via a corresponding transmission parameter group within a first time-domain resource in the first sub-band.

In one embodiment, the above UE is characterized in that the UE transmits the first radio signal through the first antenna port group within the first time-domain resource in the first sub-band; the K1 is greater than 1, and the K1 access detections are used for determining the first transmission parameter group out of the K1 transmission parameter groups.

In one embodiment, the above UE is characterized in that the UE drops wireless transmission through the first antenna port group within the first time-domain resource in the first sub-band; the K1 is equal to the K, and each of the K1 access detections indicates that wireless transmission cannot be performed through a corresponding transmission parameter group within the first time-domain resource in the first sub-band.

In one embodiment, the above UE is characterized in that the UE autonomously determines the K transmission parameter groups based on the first precoding matrix.

In one embodiment, the above UE is characterized in that the first precoding matrix corresponds to K precoding matrixes, and the K precoding matrixes are used for determining the K transmission parameter groups, the K precoding matrixes being pre-defined or configurable.

In one embodiment, the above UE is characterized in that the first receiver also receives second information; and transmits a first reference signal through M2 antenna port(s); herein, the second information is used for indicating a time-domain resource occupied by the first reference signal, the first reference signal being used for determining the first precoding matrix, M2 being a positive integer no greater than the M.

In one embodiment, the above UE is characterized in that the first receiver also receives third information; herein, the third information is used for indicating configuration information of the first radio signal.

The present disclosure provides a base station for wireless communications, comprising:

a second transmitter, which transmits first information, the first information being used for indicating a first precoding matrix; and a second receiver, which monitors whether a first radio signal is transmitted within a first time-domain resource in a first sub-band; if yes, the second receiver receives the first radio signal through a first antenna port group within the first time-domain resource in the first sub-band;

herein, the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

In one embodiment, the above base station is characterized in that the first precoding matrix is for M1 antenna ports, while each of the K transmission parameter groups is for M antenna ports, M being a positive integer greater than 1, and M1 being a positive integer greater than 1, and the M1 is no greater than the M.

In one embodiment, the above base station is characterized in that a receiver of the first information performs K1 access detection(s) on the first sub-band, K1 being a positive integer no greater than the K; herein, K1 transmission parameter group(s) of the K transmission parameter groups is(are) respectively used for the K1 access detection(s), and the first transmission parameter group is one of the K1 transmission parameter group(s); the K1 access detection(s) is(are) respectively used for determining whether wireless transmission can be performed via a corresponding transmission parameter group within a first time-domain resource in the first sub-band.

In one embodiment, the above base station is characterized in that a receiver of the first information transmits the first radio signal through the first antenna port group within the first time-domain resource in the first sub-band; the K1 is greater than 1, and the K1 access detections are used for determining the first transmission parameter group out of the K1 transmission parameter groups.

In one embodiment, the above base station is characterized in that a receiver of the first information drops wireless transmission through the first antenna port group within the first time-domain resource in the first sub-band; the K1 is equal to the K, and each of the K1 access detections indicates that wireless transmission cannot be performed through a corresponding transmission parameter group within the first time-domain resource in the first sub-band.

In one embodiment, the above base station is characterized in that a receiver of the first information autonomously determines the K transmission parameter groups based on the first precoding matrix.

In one embodiment, the above base station is characterized in that the first precoding matrix corresponds to K precoding matrixes, and the K precoding matrixes are used for determining the K transmission parameter groups, the K precoding matrixes being pre-defined or configurable.

In one embodiment, the above base station is characterized in that the second transmitter also transmits second information; and receives a first reference signal through M2 antenna port(s); herein, the second information is used for indicating a time-domain resource occupied by the first reference signal, the first reference signal being used for determining the first precoding matrix, M2 being a positive integer no greater than the M.

In one embodiment, the above base station is characterized in that the second transmitter also transmits third information; herein, the third information is used for indicating configuration information of the first radio signal.

In one embodiment, the present disclosure is advantageous over conventional schemes in the following aspects:

A base station indicates a PMI, and a UE determines a limited beam coverage according to this PMI. The beam coverage comprises several beams, on which channel listening is performed. When an LBT test result of any of the beams turns out to be channel idleness, the UE will be performing uplink radio signal transmission using this beam instead of directly employing the PMI indicated by the base station, as is traditionally done in this art, thus enhancing the chance of channel access and also the system capacity.

Multiple beams included by the beam coverage may be PMIs selected from a codebook pre-defined by Standards, or determined by the UE itself in accordance with given rules and based on its own capabilities.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
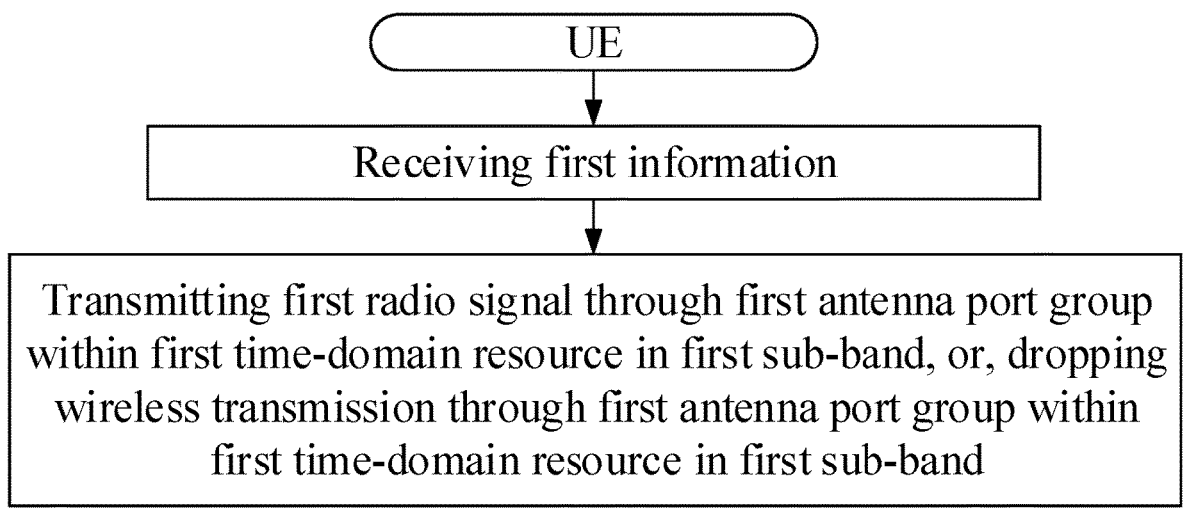
FIG. 1 illustrates a flowchart of first information and a first radio signal according to one embodiment of the present disclosure.

Embodiment 1 illustrates a flowchart of first information and a first radio signal, as shown in FIG. 1.

In Embodiment 1, the UE in the present disclosure receives first information, the first information being used for indicating a first precoding matrix; and transmits a first radio signal through a first antenna port group within a first time-domain resource in a first sub-band, or, drops wireless transmission through a first antenna port group within a first time-domain resource in a first sub-band; herein, the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

In one embodiment, the first information explicitly indicates a first precoding matrix.

In one embodiment, the first information implicitly indicates a first precoding matrix.

In one embodiment, the first information comprises an index of the first precoding matrix among multiple precoding matrixes.

In one embodiment, the first information comprises an index of the first precoding matrix in a codebook, which is composed by a positive integer number of precoding matrix(es).

In one embodiment, the first information comprises a Precoding matrix indicator (PMI), and the first precoding matrix is a precoding matrix corresponding to the PMI comprised by the first information.

In one embodiment, the first information comprises a Transmit PMI (TPMI), and the first precoding matrix is a precoding matrix corresponding to the TPMI comprised by the first information.

In one embodiment, the first information is semi-statically configured.

In one embodiment, the first information is carried by a higher-layer signaling.

In one embodiment, the first information is carried by a Radio Resource Control (RRC) signaling.

In one embodiment, the first information is all or part of an Information Element (IE) in an RRC signaling.

In one embodiment, the first information is carried by a Medium Access Control (MAC) Control Element (CE) signaling.

In one embodiment, the first information is carried by a broadcast signaling.

In one embodiment, the first information is system information.

In one embodiment, the first information is transmitted in a System Information Block (SIB).

In one embodiment, the first information is dynamically configured.

In one embodiment, the first information is carried by a physical layer signaling.

In one embodiment, the first information belongs to Downlink Control Information (DCI).

In one embodiment, the first information belongs to UpLink Grant DCI.

In one embodiment, the first information is a field of a piece of DCI, comprising a positive integer number of bit(s).

In one embodiment, the first information is composed of multiple fields of a piece of DCI, each comprising a positive integer number of bit(s).

In one embodiment, the first information is transmitted on the first sub-band.

In one embodiment, the first information is transmitted on a frequency band other than the first sub-band.

In one embodiment, the first information is transmitted on a frequency band deployed at Licensed Spectrum other than the first sub-band.

In one embodiment, the first information is transmitted on a frequency band deployed at Unlicensed Spectrum other than the first sub-band.

In one embodiment, the first information is transmitted on a frequency band deployed at Licensed Spectrum.

In one embodiment, the first information is transmitted on a frequency band deployed at Unlicensed Spectrum.

In one embodiment, the first information is transmitted on a downlink physical layer control channel (i.e., a downlink channel only capable of carrying a physical layer signaling).

In one subembodiment, the downlink physical layer control channel is a Physical Downlink Control CHannel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the first information is transmitted on a downlink physical layer data channel (i.e., a downlink channel capable of carrying physical layer data).

In one subembodiment, the downlink physical layer data channel is a Physical Downlink Shared CHannel (PDSCH).

In one subembodiment, the downlink physical layer data channel is a short PDSCH (sPDSCH).

In one subembodiment, the downlink physical layer data channel is a New Radio PDSCH (NR-PDSCH).

In one subembodiment, the downlink physical layer data channel is a Narrow Band PDSCH (NB-PDSCH).

In one embodiment, a quantity of row vectors comprised in the first precoding matrix is a positive integer greater than 1.

In one embodiment, a quantity of column vector(s) comprised in the first precoding matrix is a positive integer.

In one embodiment, a quantity of column vector(s) comprised in the first precoding matrix is equal to 1.

In one embodiment, a quantity of column vector(s) comprised in the first precoding matrix is greater than 1.

In one embodiment, an antenna port group is composed of a positive integer number of antenna port(s).

In one embodiment, the phrase that the first transmission parameter group is used for generating the first antenna port group means that the first transmission parameter group comprises a transmission beam on the first antenna port group.

In one embodiment, the phrase that the first transmission parameter group is used for generating the first antenna port group means that the first transmission parameter group comprises a transmission beamforming matrix on the first antenna port group.

In one embodiment, the phrase that the first transmission parameter group is used for generating the first antenna port group means that the first transmission parameter group comprises a transmission beamforming vector on the first antenna port group.

In one embodiment, the phrase that the first transmission parameter group is used for generating the first antenna port group means that the first transmission parameter group comprises Spatial Tx parameters on the first antenna port group.

In one embodiment, the phrase that the first transmission parameter group is used for generating the first antenna port group means that the first transmission parameter group comprises a Tx spatial filtering on the first antenna port group.

In one embodiment, the transmission beam is a transmission analog beam.

In one embodiment, the transmission beam is a transmission digital beam.

In one embodiment, the transmission beam is a transmission hybrid analog and digital beam.

In one embodiment, a quantity of column vector(s) comprised in the transmission beamforming matrix is greater than 1.

In one embodiment, a quantity of column vector(s) comprised in the transmission beamforming matrix is equal to 1, i.e., the transmission beamforming matrix is a transmission beamforming vector.

In one embodiment, the transmission beamforming matrix is a transmission analog beamforming matrix.

In one embodiment, the transmission beamforming matrix is a transmission digital beamforming matrix.

In one embodiment, the transmission beamforming matrix is a transmission hybrid analog and digital beamforming matrix.

In one embodiment, the transmission beamforming vector is a transmission analog beamforming vector.

In one embodiment, the transmission beamforming vector is a transmission digital beamforming vector.

In one embodiment, the transmission beamforming vector is a transmission hybrid analog and digital beamforming vector.

In one embodiment, the K transmission parameter groups are different.

In one embodiment, each of the K transmission parameter groups comprises a transmission beam.

In one embodiment, each of the K transmission parameter groups comprises a transmission beamforming matrix.

In one embodiment, each of the K transmission parameter groups comprises a transmission beamforming vector.

In one embodiment, each of the K transmission parameter groups comprises Spatial Tx parameters.

In one embodiment, each of the K transmission parameter groups comprises a Tx spatial filtering.

In one embodiment, each of the K transmission parameter groups is different from the first precoding matrix.

In one embodiment, each of the K transmission parameter groups is different from a transmission parameter group generated by the first precoding matrix.

In one embodiment, the transmission parameter group generated by the first precoding matrix comprises a transmission beam.

In one embodiment, the transmission parameter group generated by the first precoding matrix comprises a transmission beamforming matrix.

In one embodiment, the transmission parameter group generated by the first precoding matrix comprises a transmission beamforming matrix, the transmission beamforming matrix being the first precoding matrix.

In one embodiment, the transmission parameter group generated by the first precoding matrix comprises a transmission beamforming vector.

In one embodiment, the transmission parameter group generated by the first precoding matrix comprises a transmission beamforming vector, the transmission beamforming vector being the first precoding matrix, which comprising 1 column vector.

In one embodiment, the transmission parameter group generated by the first precoding matrix comprises Spatial Tx parameters.

In one embodiment, the transmission parameter group generated by the first precoding matrix comprises Tx spatial filtering.

In one embodiment, the first sub-band comprises a positive integer number of Physical Resource Block(s) (PRB).

In one embodiment, the first sub-band comprises a positive integer number of consecutive PRBs.

In one embodiment, the first sub-band comprises a positive integer number of Resource Block(s) (RB).

In one embodiment, the first sub-band comprises a positive integer number of consecutive RBs.

In one embodiment, the first sub-band comprises a positive integer number of consecutive subcarriers.

In one embodiment, a number of consecutive subcarriers comprised by the first sub-band is a positive integral multiple of 12.

In one embodiment, the first sub-band is deployed at Unlicensed Spectrum.

In one embodiment, the first sub-band comprises a carrier.

In one embodiment, the first sub-band comprises at least one carrier.

In one embodiment, the first sub-band belongs to a carrier.

In one embodiment, the first sub-band comprises a Bandwidth Part (BWP).

In one embodiment, the first sub-band comprises at least one BWP.

In one embodiment, the first sub-band belongs to a BWP.

In one embodiment, the first sub-band comprises at least one Subband.

In one embodiment, the first sub-band comprises a Subband.

In one embodiment, a time-domain duration of a first time-domain resource in the first sub-band is no greater than a Max Channel Occupy Time (MCOT) of the first sub-band.

In one embodiment, a time-domain duration of a first time-domain resource in the first sub-band is no greater than a Max Channel Occupy Time (MCOT).

In one embodiment, a first time-domain resource in the first sub-band comprises a positive integer number of time unit(s) in time domain.

In one subembodiment, the positive integer number of time units comprised by the first time-domain resource in the first sub-band are consecutive in time domain.

In one subembodiment, at least two time units of the positive integer number of time units comprised by the first time-domain resource in the first sub-band are consecutive in time domain.

In one subembodiment, at least two time units of the positive integer number of time units comprised by the first time-domain resource in the first sub-band are non-consecutive in time domain.

In one subembodiment of the above embodiment, the time unit is a Subframe.

In one subembodiment of the above embodiment, the time unit is a Slot.

In one subembodiment of the above embodiment, the time unit is a mini-Slot.

In one subembodiment of the above embodiment, the time unit comprises a positive integer number of multicarrier symbol(s).

In one embodiment, a first time-domain resource in the first sub-band comprises a time unit in time domain.

In one subembodiment of the above embodiment, the time unit is a Subframe.

In one subembodiment of the above embodiment, the time unit is a Slot.

In one subembodiment of the above embodiment, the time unit is a mini-Slot.

In one subembodiment of the above embodiment, the time unit comprises a positive integer number of multicarrier symbol(s).

In one embodiment, a first time-domain resource in the first sub-band belongs to a time unit in time domain.

In one subembodiment of the above embodiment, the time unit is a Subframe.

In one subembodiment of the above embodiment, the time unit is a Slot.

In one subembodiment of the above embodiment, the time unit is a mini-Slot.

In one subembodiment of the above embodiment, the time unit comprises a positive integer number of multicarrier symbol(s).

In one embodiment, a first time-domain resource in the first sub-band comprises a positive integer number of multicarrier symbol(s) in time domain.

In one embodiment, the multicarrier symbol is an Orthogonal Frequency-Division Multiplexing (OFDM) symbol.

In one embodiment, the multicarrier symbol is a Single-Carrier Frequency-Division Multiple Access (SC-FDMA) symbol.

In one embodiment, the multicarrier symbol is a Filter Bank Multi Carrier (FBMC) symbol.

In one embodiment, the first sub-band comprises a frequency-domain resource reserved for the first radio signal.

In one embodiment, the first sub-band comprises a frequency-domain resource occupied by the first radio signal.

In one embodiment, a frequency-domain resource reserved for the first radio signal comprises a positive integer number of subcarrier(s).

In one embodiment, a frequency-domain resource occupied by the first radio signal comprises a positive integer number of subcarrier(s).

In one embodiment, a first time-domain resource in the first sub-band comprises a time-domain resource reserved for the first radio signal.

In one embodiment, a first time-domain resource in the first sub-band comprises a time-domain resource occupied by the first radio signal.

In one embodiment, a time-domain resource reserved for the first radio signal comprises a positive integer number of multicarrier symbol(s).

In one embodiment, a time-domain resource occupied by the first radio signal comprises a positive integer number of multicarrier symbol(s).

In one embodiment, a start time of a first time-domain resource in the first sub-band is a start time of a transmission of the first radio signal.

In one embodiment, a start time of a first time-domain resource in the first sub-band is a start time of a time-domain resource reserved for the first radio signal.

In one embodiment, a starting multicarrier symbol of a first time-domain resource in the first sub-band is a starting multicarrier symbol of a time-domain resource of the first radio signal.

In one embodiment, the first radio signal comprises at least one of data, control information or a reference signal.

In one embodiment, the first radio signal comprises data.

In one embodiment, the first radio signal comprises control information.

In one embodiment, the first radio signal comprises a reference signal.

In one embodiment, the first radio signal comprises data, control information and a reference signal.

In one embodiment, the first radio signal comprises data and control information.

In one embodiment, the first radio signal comprises control information and a reference signal.

In one embodiment, the first radio signal comprises data and a reference signal.

In one embodiment, the data comprised by the first radio signal is uplink data.

In one embodiment, the control information comprised by the first radio signal is Uplink control information (UCI).

In one embodiment, the control information comprised by the first radio signal comprises at least one of Hybrid Automatic Repeat reQuest (HARQ) feedback, a HARQ process number, a New Data Indicator (NDI), a start time of transmission of the first radio signal, Channel State Information (CSI) or a Scheduling Request (SR).

In one subembodiment, the CSI comprises at least one of a Rank indication (RI), a Precoding matrix indicator (PMI), a Channel quality indicator (CQI) or a Csi-reference signal Resource Indicator (CRI).

In one subembodiment, the HARQ process number is a serial number of a HARQ process corresponding to the data comprised by the first radio signal.

In one subembodiment, the NDI indicates whether the data comprised by the first radio signal is a retransmission of new data or a retransmission of old data.

In one embodiment, the reference signal comprised by the first radio signal comprises one or more of a DeModulation Reference Signal (DMRS), a Sounding Reference Signal (SRS) or Phase error Tracking Reference Signals (PTRS).

In one embodiment, the reference signal comprised by the first radio signal comprises an SRS.

In one embodiment, the reference signal comprised by the first radio signal comprises a DMRS.

In one embodiment, the reference signal comprised by the first radio signal comprises a PTRS.

In one embodiment, the first radio signal is transmitted on an uplink random access channel.

In one subembodiment, the uplink random access channel is a Physical Random Access Channel (PRACH).

In one embodiment, a transmission channel for the first radio signal is an Uplink Shared Channel (UL-SCH).

In one embodiment, the first radio signal is transmitted on an uplink physical layer data channel (i.e., an uplink channel capable of carrying physical layer data).

In one subembodiment, the uplink physical layer data channel is a Physical Uplink Shared CHannel (PUSCH).

In one subembodiment, the uplink physical layer data channel is a short PUSCH (sPUSCH).

In one subembodiment, the uplink physical layer data channel is a New Radio PUSCH (NR-PUSCH).

In one subembodiment, the uplink physical layer data channel is a Narrow Band PUSCH (NB-PUSCH).

In one embodiment, the first radio signal is transmitted on an uplink physical layer control channel (i.e., an uplink channel only capable of carrying a physical layer signaling).

In one subembodiment, the uplink physical layer control channel is a Physical Uplink Control CHannel (PUCCH).

In one subembodiment, the uplink physical layer control channel is a short PUCCH (sPUCCH).

In one subembodiment, the uplink physical layer control channel is a New Radio PUCCH (NR-PUCCH).

In one subembodiment, the uplink physical layer control channel is a Narrow Band PUCCH (NB-PUCCH).

In one embodiment, the UE autonomously determines the first transmission parameter group out of the K transmission parameter groups.

In one embodiment, how to determine the first transmission parameter group out of the K transmission parameter groups is related to the implementation of the UE, namely, there is no need for standardization.

In one embodiment, the UE determines the first transmission parameter group out of the K transmission parameter groups through an access detection.

In one embodiment, the UE arbitrarily selects any transmission parameter group from the K transmission parameter groups as the first transmission parameter group.

Embodiment 2

Figure 2:
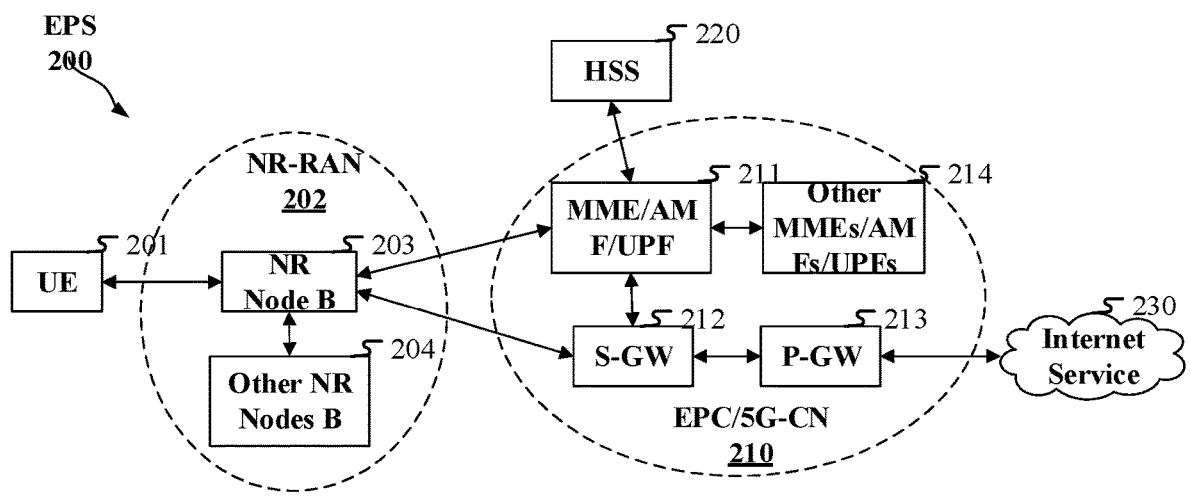
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Satellite Mobile Communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions.

Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the UE in the present disclosure.

In one embodiment, the gNB 203 corresponds to the base station in the present disclosure.

In one embodiment, the UE 201 supports wireless communications with data transmitted on Unlicensed Spectrum.

In one embodiment, the UE 201 supports wireless communications with data transmitted on Licensed Spectrum.

In one embodiment, the gNB 203 supports wireless communications with data transmitted on Unlicensed Spectrum.

In one embodiment, the gNB 203 supports wireless communications with data transmitted on Licensed Spectrum.

In one embodiment, the UE 201 supports massive MIMO-based wireless communications.

In one embodiment, the gNB 203 supports massive MIMO-based wireless communications.

Embodiment 3

Figure 3:
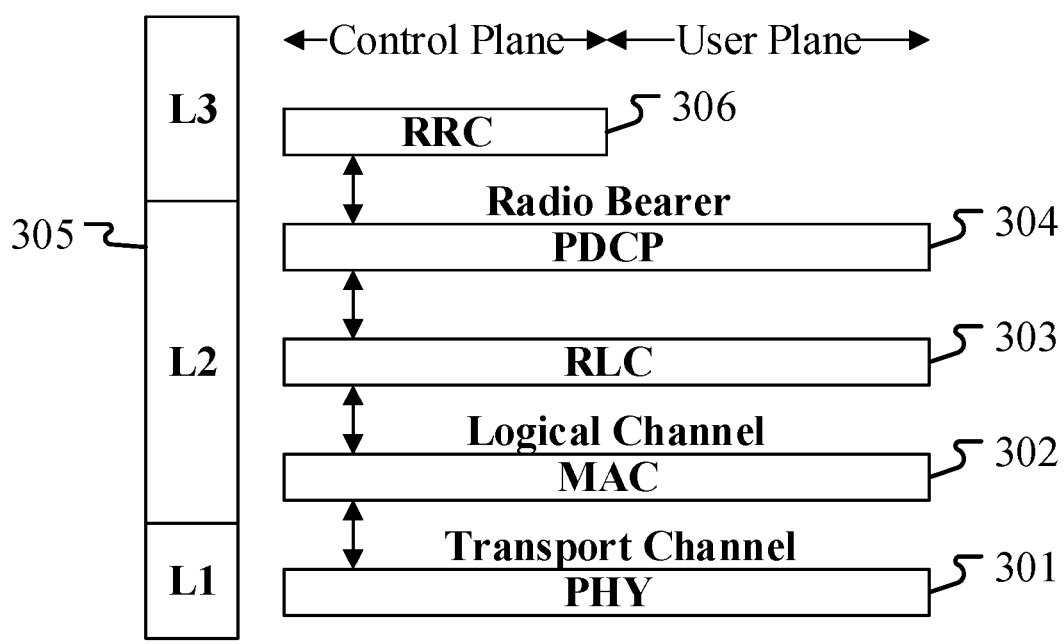
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB, eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first information in the present disclosure is generated by the RRC sublayer 306.

In one embodiment, the first information in the present disclosure is generated by the MAC sublayer 302.

In one embodiment, the first information in the present disclosure is generated by the PHY 301.

In one embodiment, the second information in the present disclosure is generated by the RRC sublayer 306.

In one embodiment, the second information in the present disclosure is generated by the MAC sublayer 302.

In one embodiment, the second information in the present disclosure is generated by the PHY 301.

In one embodiment, the third information in the present disclosure is generated by the RRC sublayer 306.

In one embodiment, the third information in the present disclosure is generated by the MAC sublayer 302.

In one embodiment, the third information in the present disclosure is generated by the PHY 301.

In one embodiment, the fourth information in the present disclosure is generated by the RRC sublayer 306.

In one embodiment, the fourth information in the present disclosure is generated by the MAC sublayer 302.

In one embodiment, the fifth information in the present disclosure is generated by the RRC sublayer 306.

In one embodiment, the fifth information in the present disclosure is generated by the MAC sublayer 302.

In one embodiment, the sixth information in the present disclosure is generated by the PHY 301.

In one embodiment, the first reference signal in the present disclosure is generated by the PHY 301.

In one embodiment, the K1 access detection(s) in the present disclosure is(are) generated by the PHY 301.

In one embodiment, the first access detection in the present disclosure is generated by the PHY 301.

In one embodiment, the second access detection in the present disclosure is generated by the PHY 301.

In one embodiment, the first radio signal in the present disclosure is generated by the PHY 301.

In one embodiment, the action of monitoring whether the first radio signal in the present disclosure is transmitted within a first time-domain resource in the first sub-band in the present disclosure is generated by the PHY 301.

In one embodiment, the action of monitoring whether the first reference signal in the present disclosure is transmitted within a second time-domain resource in a second sub-band in the present disclosure is generated by the PHY 301.

Embodiment 4

Figure 4:
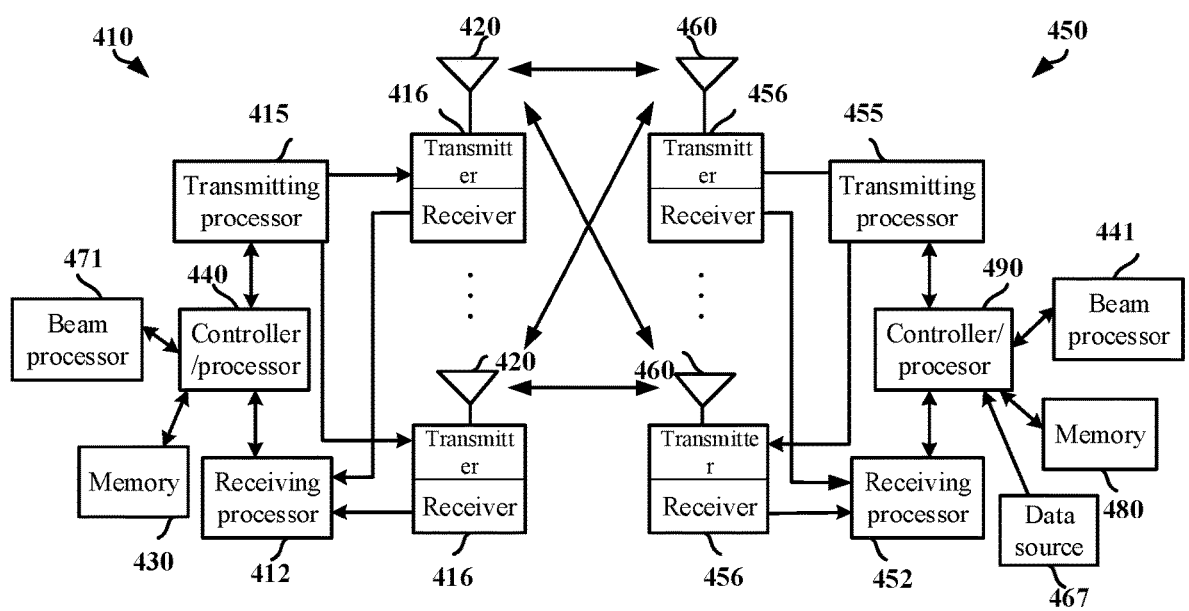
FIG. 4 illustrates a schematic diagram of a New Radio (NR) node and a UE according to one embodiment of the present disclosure.

Embodiment 4 illustrates a schematic diagram of a base station (NR node) and a UE, as shown in FIG. 4. FIG. 4 is a block diagram of a gNB 410 in communication with UE 450 in an access network.

A base station (410) comprises a controller/processor 440, a memory 430, a receiving processor 412, a beam processor 471, a transmitting processor 415, a transmitter/receiver 416 and an antenna 420.

A UE (450) comprises a controller/processor 490, a memory 480, a data source 467, a beam processor 441, a transmitting processor 455, a receiving processor 452, a transmitter/receiver 456 and antenna 460.

In downlink (DL) transmission, processes relevant to the base station 410 comprise the following:

A higher-layer packet is provided to the controller/processor 440, and the controller/processor 440 provides header compression, encryption, packet segmentation and reordering as well as multiplexing and demultiplexing between a logical channel and a transport channel so as to implement the L2 layer protocols used for the user plane and the control plane; the higher-layer packet may comprise data or control information, such as a Downlink Shared Channel (DL-SCH).

The controller/processor 440 is associated with the memory 430 that stores program code and data; the memory 430 can be a computer readable medium.

The controller/processor 440 comprises a scheduling unit for transmission requests, where the scheduling unit is used to schedule radio resources corresponding to transmission requests.

The beam processor 471 determines first information.

The transmitting processor 415 receives bit flows output from the controller/processor 440 and provides various signal transmitting processing functions used for the L1 layer (that is PHY), including coding, interleaving, scrambling, modulating, power control/allocation and generation of physical layer control signaling (such as PBCH, PDCCH, PHICH, PCFICH and a reference signal).

The transmitting processor 415 receives bit flows output from the controller/processor 440 and provides various signal transmitting processing functions used for the L1 layer (that is PHY), including multi-antenna transmission, spreading, code division multiplexing, and precoding.

The transmitter 416 is configured to convert a baseband signal provided from the transmitting processor 415 into a radio frequency signal which is to be transmitted via the antenna 420; each transmitter 416 performs sampling processing on respectively input symbol stream to acquire respective sampled signal stream. And each transmitter 416 further processes respectively sampled stream, for instance, by digital-to-analogue conversion, amplification, filtering and upconversion, to obtain a downlink signal.

In downlink transmission, processes relevant to the UE 450 may comprise the following:

The receiver 456 is used to convert a radio frequency signal received via the antenna 460 into a baseband signal to be provided to the receiving processor 452.

The receiving processor 452 provides various signal receiving processing functions used for the L1 layer (that is PHY), including decoding, de-interleaving, descrambling, demodulating and extraction of physical layer control signaling.

The receiving processor 452 provides various signal receiving processing functions used for the L1 layer (that is PHY), including multi-antenna reception, despreading, code division multiplexing and precoding.

The beam processor 441 determines first information.

The controller/processor 490 receives bit flows output by the receiving processor 452, and provides header decompression, decryption, packet segmentation and reordering as well as multiplexing and demultiplexing between a logical channel and a transport channel so as to implement the L2 layer protocols used for the user plane and the control plane.

The controller/processor 490 is associated with the memory 480 that stores program code and data; the memory 480 may be called a computer readable medium.

In uplink (UL) transmission, processes relevant to the base station 410 comprise the following:

The receiver 416 receives a radio frequency signal via a corresponding antenna 420, converting the radio frequency signal into a baseband signal and providing the baseband signal to the receiving processor 412.

The receiving processor 412 provides various signal receiving processing functions used for the L1 layer (that is PHY), including decoding, de-interleaving, descrambling, demodulation and extraction of physical layer control signaling.

The receiving processor 412 provides various signal receiving processing functions used for the L1 layer (that is PHY), including multi-antenna reception, despreading, code division multiplexing and precoding.

The controller/processor 440 implements the functions of the L2 layer, and is associated with the memory 430 that stores program code and data.

The controller/processor 440 provides demultiplexing between a transport channel and a logical channel, packet reassembling, decryption, header decompression and control signal processing so as to recover a higher-layer packet from the UE 450; the higher-layer packet may be provided to a core network.

The beam processor 471 determines whether a first radio signal is transmitted within a first time-domain resource in a first sub-band.

In UL, processes relevant to the UE 450 comprise the following:

The data source 467 provides a higher-layer packet to the controller/processor 490. The data source 467 represents all protocol layers above the L2 layer.

The transmitter 456 transmits a radio frequency signal via a corresponding antenna 460, converting a baseband signal into a radio frequency signal and providing the radio frequency signal to the corresponding antenna 460.

The transmitting processor 455 provides various signal transmitting processing functions used for the L1 layer (i.e., PHY), including coding, interleaving, scrambling, modulation and generation of physical layer control signaling.

The transmitting processor 455 provides various signal transmitting processing functions used for the L1 layer (i.e., PHY), including multi-antenna transmission, spreading, code division multiplexing and precoding.

The controller/processor 490 performs header compression, encryption, packet segmentation and reordering as well as multiplexing between a logical channel and a transport channel based on radio resources allocation of the gNB 410, thereby implementing the L2 layer functions used for the user plane and the control plane.

The controller/processor 490 is also in charge of HARQ operation, retransmission of a lost packet and a signaling to the gNB 410.

The beam processor 441 determines whether to transmit a first radio signal through a first antenna port group within a first time-domain resource in a first sub-band.

In one embodiment, the UE 450 comprises at least one processor and at least one memory. The at least one memory includes computer program codes. The at least one memory and the computer program codes are configured to be used in collaboration with the at least one processor. The UE 450 at least receives first information, the first information being used for indicating a first precoding matrix; and transmits a first radio signal through a first antenna port group within a first time-domain resource in a first sub-band, or, drops wireless transmission through a first antenna port group within a first time-domain resource in a first sub-band; herein, the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

In one embodiment, the UE 450 comprises a memory that stores a computer readable instruction program. The computer readable instruction program generates actions when executed by at least one processor, which include: receiving first information, the first information being used for indicating a first precoding matrix; and transmitting a first radio signal through a first antenna port group within a first time-domain resource in a first sub-band, or, dropping wireless transmission through a first antenna port group within a first time-domain resource in a first sub-band; herein, the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

In one embodiment, the gNB 410 comprises at least one processor and at least one memory. The at least one memory includes computer program codes. The at least one memory and the computer program codes are configured to be used in collaboration with the at least one processor. The gNB 410 at least transmits first information, the first information being used for indicating a first precoding matrix; and monitors whether a first radio signal is transmitted within a first time-domain resource in a first sub-band; if yes, the gNB 410 receives the first radio signal through a first antenna port group within the first time-domain resource in the first sub-band; herein, the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

In one embodiment, the gNB 410 comprises a memory that stores a computer readable instruction program. The computer readable instruction program generates actions when executed by at least one processor, which include: transmitting first information, the first information being used for indicating a first precoding matrix; and monitoring whether a first radio signal is transmitted within a first time-domain resource in a first sub-band; if yes, the first radio signal is received through a first antenna port group within the first time-domain resource in the first sub-band; herein, the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

In one embodiment, the UE 450 corresponds to the UE in the present disclosure.

In one embodiment, the gNB 410 corresponds to the base station in the present disclosure.

In one embodiment, at least the first two of the receiver 456, the receiving processor 452 and the controller/processor 490 are used for receiving the first information in the present disclosure.

In one embodiment, at least the first two of the transmitter 416, the transmitting processor 415 and the controller/processor 440 are used for transmitting the first information in the present disclosure.

In one embodiment, at least the first two of the receiver 456, the receiving processor 452 and the controller/processor 490 are used for receiving the second information in the present disclosure.

In one embodiment, at least the first two of the transmitter 416, the transmitting processor 415 and the controller/processor 440 are used for transmitting the second information in the present disclosure.

In one embodiment, at least the first two of the receiver 456, the receiving processor 452 and the controller/processor 490 are used for receiving the third information in the present disclosure.

In one embodiment, at least the first two of the transmitter 416, the transmitting processor 415 and the controller/processor 440 are used for transmitting the third information in the present disclosure.

In one embodiment, at least the first two of the receiver 456, the receiving processor 452 and the controller/processor 490 are used for receiving the fourth information in the present disclosure.

In one embodiment, at least the first two of the transmitter 416, the transmitting processor 415 and the controller/processor 440 are used for transmitting the fourth information in the present disclosure.

In one embodiment, at least the first two of the receiver 456, the receiving processor 452 and the controller/processor 490 are used for receiving the fifth information in the present disclosure.

In one embodiment, at least the first two of the transmitter 416, the transmitting processor 415 and the controller/processor 440 are used for transmitting the fifth information in the present disclosure.

In one embodiment, at least the first two of the receiver 456, the receiving processor 452 and the controller/processor 490 are used for receiving the sixth information in the present disclosure.

In one embodiment, at least the first two of the transmitter 416, the transmitting processor 415 and the controller/processor 440 are used for transmitting the sixth information in the present disclosure.

In one embodiment, at least the first two of the receiver 456, the receiving processor 452 and the controller/processor 490 are used for performing the K1 access detection(s) in the present disclosure.

In one embodiment, at least the first two of the receiver 456, the receiving processor 452 and the controller/processor 490 are used for performing the first access detection in the present disclosure.

In one embodiment, at least the first two of the receiver 456, the receiving processor 452 and the controller/processor 490 are used for performing the second access detection in the present disclosure.

In one embodiment, at least the first two of the transmitter 456, the transmitting processor 455 and the controller/processor 490 are used for transmitting the first radio signal in the present disclosure through the first antenna port group in the present disclosure within a first time-domain resource in the first sub-band in the present disclosure.

In one embodiment, at least the first two of the receiver 416, the receiving processor 412 and the controller/processor 440 are used for receiving the first radio signal in the present disclosure through the first antenna port group in the present disclosure within a first time-domain resource in the first sub-band in the present disclosure.

In one embodiment, at least the first two of the transmitter 456, the transmitting processor 455 and the controller/processor 490 are used for transmitting the first reference signal in the present disclosure through the M2 antenna port(s) in the present disclosure.

In one embodiment, at least the first two of the receiver 416, the receiving processor 412 and the controller/processor 440 are used for receiving the first reference signal in the present disclosure through the M2 antenna port(s) in the present disclosure.

In one embodiment, at least the first two of the receiver 416, the receiving processor 412 and the controller/processor 440 are used for monitoring whether the first radio signal in the present disclosure is transmitted within a first time-domain resource in the first sub-band in the present disclosure.

In one embodiment, at least the first two of the receiver 416, the receiving processor 412 and the controller/processor 440 are used for monitoring whether the first reference signal in the present disclosure is transmitted within a second time-domain resource in the second sub-band in the present disclosure.

Embodiment 5

Figure 5:
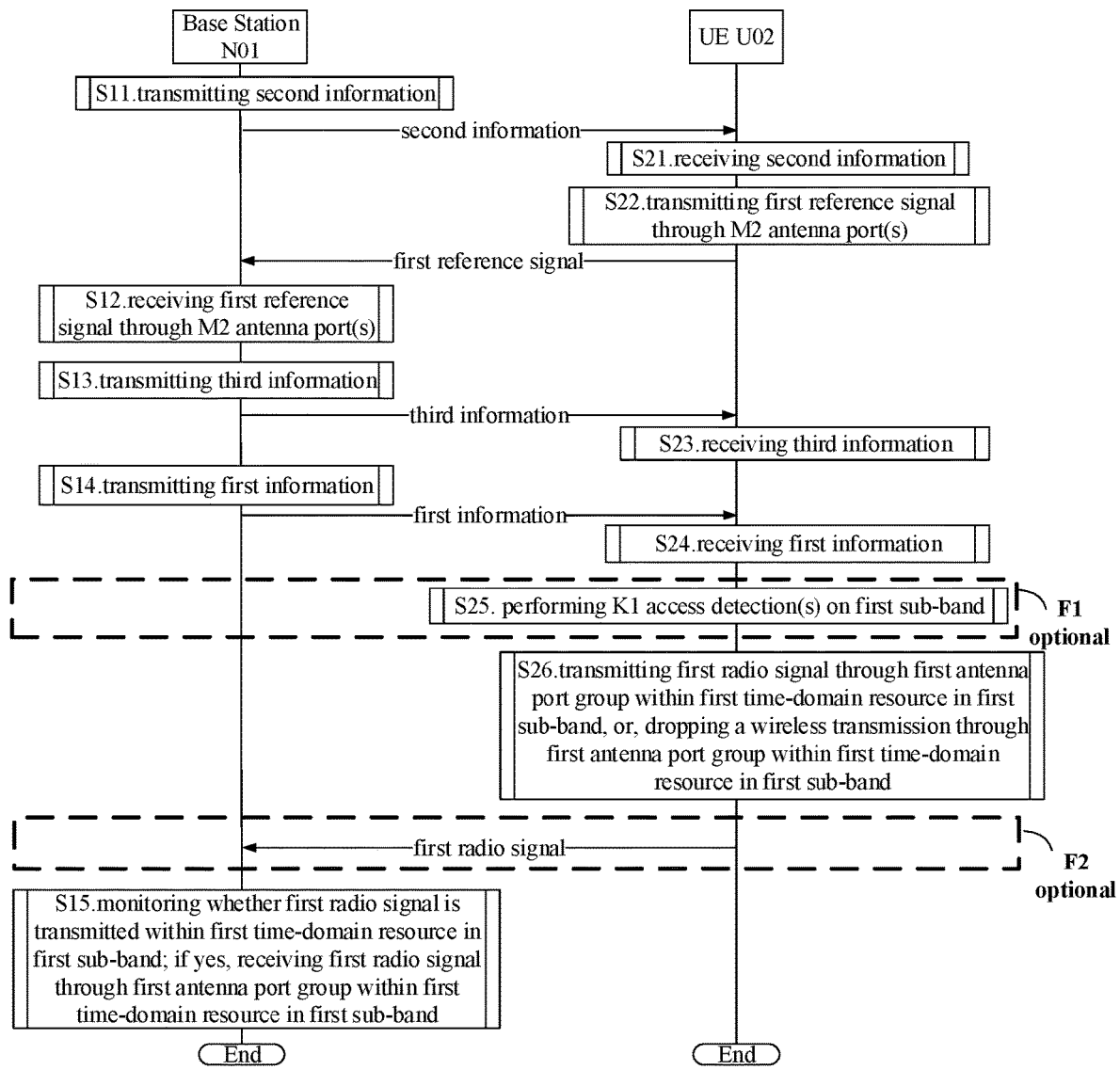
FIG. 5 illustrates a flowchart of wireless transmission according to one embodiment of the present disclosure.

Embodiment 5 illustrates a flowchart of wireless transmission, as shown in FIG. 5. In FIG. 5, a base station N01 is a maintenance base station for a serving cell of a UE U02. Box F1 and box F2 in FIG. 5 are optional.

The N01 transmits second information in step S11; and receives a first reference signal through M2 antenna port(s) in step S12; transmits third information in step S13; transmits first information in step S14; and monitors whether a first radio signal is transmitted within a first time-domain resource in a first sub-band in step S15; if yes, the first radio signal is received through a first antenna port group within the first time-domain resource in the first sub-band.

The U02 receives second information in step S21; and transmits a first reference signal through M2 antenna port(s) in step S22; receives third information in step S23; receives first information in step S24; and performs K1 access detection(s) on a first sub-band in step S25; transmits a first radio signal through a first antenna port group within a first time-domain resource in a first sub-band in step S26, or, drops wireless transmission through the first antenna port group within the first time-domain resource in the first sub-band.

In Embodiment 5, the first information is used for indicating a first precoding matrix; the first precoding matrix is used by the U02 for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s). The K1 is a positive integer no greater than the K; K1 transmission parameter group(s) of the K transmission parameter groups is(are) respectively used for the K1 access detection(s), and the first transmission parameter group is one of the K1 transmission parameter group(s); the K1 access detection(s) is(are) respectively used by the U02 for determining whether wireless transmission can be performed via a corresponding transmission parameter group within a first time-domain resource in the first sub-band. The second information is used for indicating a time-domain resource occupied by the first reference signal, the first reference signal being used by the N01 for determining the first precoding matrix, M2 being a positive integer no greater than the M. The third information is used for indicating configuration information of the first radio signal.

In one embodiment, when in step S26 a first radio signal is transmitted through a first antenna port group within a first time-domain resource in a first sub-band, the box F2 exists; when wireless transmission through a first antenna port group is dropped within a first time-domain resource in a first sub-band, the box F2 does not exist.

In one embodiment, the above method also includes:
receiving the first radio signal within the first time-domain resource in the first sub-band;
herein, it is monitored within the first time-domain resource in the first sub-band that the first radio signal is transmitted.

In one embodiment, the above method also includes:
monitoring within the second time-domain resource in the second sub-band that the first reference signal is transmitted.

In one embodiment, the above method also includes:
performing a second access detection to determine that the first reference signal is transmitted through the M2 antenna port(s) within a second time-domain resource in a second sub-band;
herein, an end time of the second access detection is no later than a start time of a second time-domain resource in the second sub-band.

In one embodiment, the K1 is equal to the K.

In one embodiment, the K1 is equal to 1, which means that the K1 transmission parameter group refers to the first transmission parameter group.

In one embodiment, the K1 is greater than 1 and less than the K.

In one embodiment, the UE autonomously determines the K1 transmission parameter group(s) out of the K transmission parameter groups.

In one embodiment, the UE arbitrarily selects the K1 transmission parameter group(s) from the K transmission parameter groups.

In one embodiment, how to determine the K1 transmission parameter group(s) out of the K transmission parameter groups is related to the implementation of the UE, namely, there is no need for standardization.

In one embodiment, the K1 transmission parameter group(s) is(are) transmission parameter group(s) of K transmission parameter groups with lower index(es).

In one embodiment, the K1 transmission parameter group(s) is(are) transmission parameter group(s) of K transmission parameter groups with higher index(es).

In one embodiment, each of the K1 access detection(s) is used by the U02 for determining whether the first sub-band is idle.

In one embodiment, an end time of any of the K1 access detection(s) is no later than a start time of the first time-domain resource in the first sub-band.

In one embodiment, a start time of the first time-domain resource in the first sub-band is after an end time of any of the K1 access detection(s).

In one embodiment, a given transmission parameter group is any transmission parameter group of the K1 transmission parameter group(s), and a given access detection is one of the K1 access detection(s) that corresponds to the given transmission parameter group, the given access detection being used by the U02 for determining whether wireless transmission can be performed via the given transmission parameter group within the first time-domain resource in the first sub-band.

In one embodiment, the second information explicitly indicates a time-domain resource occupied by the first reference signal.

In one embodiment, the second information implicitly indicates a time-domain resource occupied by the first reference signal.

In one embodiment, the second information comprises configuration information of the first reference signal.

In one subembodiment, the configuration information of the first reference signal comprises at least one of a periodical duration, a time-domain offset, an occupied time-domain resource, an occupied frequency-domain resource, an occupied code-domain resource, a cyclic shift, an Orthogonal Cover Code (OCC), an occupied antenna port group, a transmission sequence, adopted multi-antenna transmission or adopted multi-antenna reception.

In one subembodiment, the second information indicates periodic or semi-persistent SRS transmission.

In one subembodiment, the second information is semi-statically configured.

In one subembodiment, the second information is carried by a higher-layer signaling.

In one subembodiment, the second information is dynamically configured.

In one subembodiment, the second information belongs to DCI.

In one subembodiment, the periodical duration, the time-domain offset, the occupied time-domain resource and the occupied frequency-domain resource comprised by the configuration information of the first reference signal jointly determine a group of periodically occurring time-frequency resources, of which the occupied time-domain resource and the occupied frequency-domain resource are respectively a time-domain resource and a frequency-domain resource in a time-domain resource unit, and a time-frequency resource occupied by the first reference signal is a time-frequency resource among the group of periodically occurring time-frequency resources.

In one subembodiment, the periodical duration, the time-domain offset, the occupied time-domain resource and the occupied frequency-domain resource comprised by the configuration information of the first reference signal jointly determine a group of periodically occurring time-frequency resources, of which the occupied time-domain resource refers to a positive integer number of multicarrier symbol(s) comprised in a time-domain resource, while the occupied frequency-domain resource refers to a positive integer number of subcarrier(s) comprised in a time-domain resource, and a time-frequency resource occupied by the first reference signal is a time-frequency resource among the group of periodically occurring time-frequency resources.

In one subembodiment, the time-domain offset is measured by time-domain resource unit.

In one subembodiment, the time-domain offset is measured by ms.

In one subembodiment, the periodical duration is measured by time-domain resource unit.

In one subembodiment, the periodical duration is measured by ms.

In one embodiment, the second information is used by the U02 for determining a time-domain resource occupied by the first reference signal.

In one subembodiment, the second information comprises a time-domain offset, and a time-domain resource occupied by the second information is used jointly with the time-domain offset comprised in the second information by the U02 for determining a time-domain resource occupied by the first reference signal.

In one subembodiment, the second information is an aperiodic SRS trigger request.

In one subembodiment, the second information is dynamically configured.

In one subembodiment, the second information belongs to DCI.

In one subembodiment, the above method also includes:
receiving fifth information;
herein, the fifth information is used for indicating configuration information of the first reference signal.

In one subembodiment, the fifth information is semi-statically configured.

In one subembodiment, the fifth information is carried by a higher-layer signaling.

In one subembodiment, the fifth information comprises configuration information of the first reference signal.

In one subembodiment, the configuration information of the first reference signal comprises at least one of an occupied time-domain resource, an occupied frequency-domain resource, an occupied code-domain resource, a cyclic shift, an OCC, an occupied antenna port group, a transmission sequence, an occupied antenna port group, a transmission sequence, adopted multi-antenna transmission or adopted multi-antenna reception.

In one subembodiment, a start time of transmission of the first reference signal is later than a start time of transmission of the second information, and a time offset between the start time of the transmission of the first reference signal and the start time of the transmission of the second information is equal to the time-domain offset comprised by the second information.

In one subembodiment, the time-domain resource occupied by the second information refers to a positive integer number of multicarrier symbol(s) in a time-domain resource unit, and the time-domain resource occupied by the first reference signal refers to a positive integer number of multicarrier symbol(s) in a time-domain resource unit; a time-domain resource unit in which the time-domain resource occupied by the second information is located is no later than a time-domain resource unit in which the time-domain resource occupied by the first reference signal is located, besides, a time offset between the time-domain resource unit in which the time-domain resource occupied by the first reference signal is located and the time-domain resource unit in which the time-domain resource occupied by the second information is located is equal to the time-domain offset comprised by the second information.

In one subembodiment, the time-domain offset is measured by time-domain resource unit.

In one subembodiment, the time-domain offset is measured by ms.

In one embodiment, the time-domain resource unit is a slot.

In one embodiment, the time-domain resource unit is a subframe.

In one embodiment, the time-domain resource unit is a mini-slot.

In one embodiment, the time-domain resource unit is composed of a positive integer number of consecutive multicarrier symbols.

In one embodiment, the time-domain resource unit is composed of 14 consecutive multicarrier symbols.

In one embodiment, the occupied antenna port group comprised by the configuration information of the first reference signal refers to an index of the occupied antenna port group among multiple antenna port groups.

In one embodiment, the occupied time-domain resource comprised by the configuration information of the first reference signal means that the occupied time-domain resource is a time-domain resource in a time-domain resource unit.

In one subembodiment, the occupied time-domain resource comprised by the configuration information of the first reference signal means that the occupied time-domain resource is a positive integer number of multicarrier symbol(s) in a time-domain resource unit.

In one embodiment, the occupied frequency-domain resource comprised by the configuration information of the first reference signal means that occupied subcarrier(s) is(are) one or more subcarriers of multiple subcarriers.

In one embodiment, the occupied frequency-domain resource comprised by the configuration information of the first reference signal refers to (an) index(es) of occupied subcarrier(s) among multiple subcarriers.

In one embodiment, the occupied frequency-domain resource comprised by the configuration information of the first reference signal refers to occupied RB(s) and (a) subcarrier(s) occupied by each RB, the occupied RB(s) referring to one or more RBs of multiple RBs, and the subcarrier(s) occupied by each RB referring to one or more subcarriers of all subcarriers comprised by an RB.

In one embodiment, the occupied frequency-domain resource comprised by the configuration information of the first reference signal refers to index(es) of occupied RB(s) and index(es) of subcarrier(s) occupied by each RB, the index(es) of the occupied RB(s) referring to index(es) of the occupied RB(s) in multiple RBs, and the index(es) of subcarrier(s) occupied by each RB referring to index(es) of the subcarrier(s) occupied by each RB in all subcarriers comprised by an RB.

In one embodiment, the occupied frequency-domain resource comprised by the configuration information of the first reference signal refers to index(es) of occupied RB(s) as well as a comb and a subcarrier offset occupied by each RB, the index(es) of the occupied RB(s) referring to (an) index(es) of the occupied RB(s) in multiple RBs.

In one subembodiment, a comb C and a subcarrier offset cl occupied in a given RB represent occupying a group of evenly distributed subcarriers in the given RB, and a subcarrier spacing between any two adjacent subcarriers in the group of evenly distributed subcarriers is equal to the C, and a first subcarrier among the group of evenly distributed subcarriers is a (cl+1)-th subcarrier in the given RB, the C being a positive integer and the cl being an integer no less than 0 and less than the C.

In one subembodiment, a comb C and a subcarrier offset cl occupied in a given RB represent occupying a group of evenly distributed subcarriers in the given RB, and a subcarrier spacing between any two adjacent subcarriers in the group of evenly distributed subcarriers is equal to the C, and a last subcarrier among the group of evenly distributed subcarriers is a (cl+1)-th subcarrier in the given RB, the C being a positive integer and the cl being an integer no less than 0 and less than the C.

In one embodiment, the occupied code-domain resource comprised by the configuration information of the first reference signal means that an occupied characteristic sequence is a candidate characteristic sequence of multiple candidate characteristic sequences.

In one embodiment, the occupied code-domain resource comprised by the configuration information of the first reference signal refers to an index of an occupied characteristic sequence among multiple candidate characteristic sequences.

In one embodiment, the transmission sequence comprised by the configuration information of the first reference signal means that the transmission sequence employed is one of multiple transmission sequences.

In one embodiment, the transmission sequence comprised by the configuration information of the first reference signal refers to an index of the transmission sequence employed among multiple transmission sequences.

In one embodiment, the second information is semi-statically configured.

In one embodiment, the second information is carried by a higher-layer signaling.

In one embodiment, the second information is carried by a Radio Resource Control (RRC) signaling.

In one embodiment, the second information is all or part of an Information Element (IE) in an RRC signaling.

In one embodiment, the second information is carried by a Medium Access Control (MAC) Control Element (CE) signaling.

In one embodiment, the second information is carried by a broadcast signaling.

In one embodiment, the second information is system information.

In one embodiment, the second information is transmitted in a SIB.

In one embodiment, the second information is dynamically configured.

In one embodiment, the second information is carried by a physical layer signaling.

In one embodiment, the second information belongs to DCI.

In one embodiment, the second information belongs to Uplink Grant DCI.

In one embodiment, the second information is a field of a piece of DCI, which comprises a positive integer number of bit(s).

In one embodiment, the second information is composed of multiple fields of a piece of DCI, of which each field comprises a positive integer number of bit(s).

In one embodiment, the second information is an aperiodic SRS trigger request.

In one embodiment, the first information and the second information respectively belong to two different pieces of DCI.

In one embodiment, the first information and the second information belong to a same IE in an RRC signaling.

In one embodiment, the first information and the second information respectively belong to different IEs in an RRC signaling.

In one embodiment, the fourth information and the second information belong to a same IE in an RRC signaling.

In one embodiment, the fourth information and the second information respectively belong to different IEs in an RRC signaling.

In one embodiment, a transmission time of the first information is later than a transmission time of the second information.

In one embodiment, a transmission time of the first information is later than a reception time of the first reference signal.

In one embodiment, the second information is transmitted on the first sub-band.

In one embodiment, the second information is transmitted on a frequency band other than the first sub-band.

In one embodiment, the second information is transmitted on a frequency band deployed at Licensed Spectrum other than the first sub-band.

In one embodiment, the second information is transmitted on a frequency band deployed at Unlicensed Spectrum other than the first sub-band.

In one embodiment, the second information is transmitted on a frequency band deployed at Licensed Spectrum.

In one embodiment, the second information is transmitted on a frequency band deployed at Unlicensed Spectrum.

In one embodiment, the second information is transmitted on a downlink physical layer control channel (i.e., a downlink channel only capable of carrying a physical layer signaling).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

In one embodiment, the second information is transmitted on a downlink physical layer data channel (i.e., a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, the first reference signal comprises an SRS.

In one embodiment, the first reference signal comprises at least one of an SRS or a PTRS.

In one embodiment, the M2 is equal to the M1.

In one embodiment, the M2 is equal to the M.

In one embodiment, the M2 is unequal to the M1.

In one embodiment, the M2 is unequal to the M, and the M2 is unequal to the M1.

In one embodiment, a transmitter of the first information autonomously determines the first precoding matrix from the M1 antenna port codebooks by receiving the first reference signal.

In one embodiment, how to determine the first precoding matrix from the M1 antenna port codebooks by receiving the first reference signal is related to the implementation of the transmitter of the first information, namely, there is no need for standardization.

In one embodiment, a transmitter of the first information estimates a channel based on the first reference signal to obtain an estimated channel, and then generates the first precoding matrix that is most suitable for the estimated channel.

In one embodiment, a transmitter of the first information estimates a channel based on the first reference signal to obtain an estimated channel, and then generates the first precoding matrix according to a generation principle, the generation principle being at least one of a maximum transmission throughput, a maximum Signal-to-Interference-plus-Noise Ratio (SINR), or a minimum BLock Error Rate (BLER).

In one embodiment, the third information explicitly indicates configuration information of the first radio signal.

In one embodiment, the third information implicitly indicates configuration information of the first radio signal.

In one embodiment, the third information comprises the configuration information of the first radio signal.

In one embodiment, the third information is semi-statically configured.

In one embodiment, the third information is carried by a higher-layer signaling.

In one embodiment, the third information is carried by an RRC signaling.

In one embodiment, the third information is all or part of an IE in an RRC signaling.

In one embodiment, the third information is carried by a MAC CE signaling.

In one embodiment, the third information is carried by a broadcast signaling.

In one embodiment, the third information is system information.

In one embodiment, the third information is transmitted in a SIB.

In one embodiment, the third information is dynamically configured.

In one embodiment, the third information is carried by a physical layer signaling.

In one embodiment, the third information belongs to DCI.

In one embodiment, the third information belongs to Uplink Grant DCI.

In one embodiment, the third information is a field of a piece of DCI, which comprises a positive integer number of bit(s).

In one embodiment, the third information is composed of multiple fields of a piece of DCI, of which each field comprises a positive integer number of bit(s).

In one embodiment, the third information is transmitted on the first sub-band.

In one embodiment, the third information is transmitted on a frequency band other than the first sub-band.

In one embodiment, the third information is transmitted on a frequency band deployed at Licensed Spectrum other than the first sub-band.

In one embodiment, the third information is transmitted on a frequency band deployed at Unlicensed Spectrum other than the first sub-band.

In one embodiment, the third information is transmitted on a frequency band deployed at Licensed Spectrum.

In one embodiment, the third information is transmitted on a frequency band deployed at Unlicensed Spectrum.

In one embodiment, the third information is transmitted on a downlink physical layer control channel.

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

In one embodiment, the third information is transmitted on a downlink physical layer data channel.

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, the first information and the third information belong to a same piece of DCI.

In one embodiment, the first information and the third information respectively belong to different fields of a piece of DCI.

In one embodiment, the configuration information of the first radio signal comprises at least an occupied time-domain resource and an occupied frequency-domain resource among an occupied time-domain resource, an occupied frequency-domain resource, a Modulation and Coding Scheme (MCS), configuration information of DMRS, configuration information of PTRS, a HARQ process number, a Redundancy Version (RV), a New Data Indicator (NDI), adopted multi-antenna transmission and adopted multi-antenna reception.

In one subembodiment, the first radio signal comprises data.

In one subembodiment, the first radio signal comprises data and DMRS.

In one subembodiment, the first radio signal comprises data, DMRS and PTRS.

In one subembodiment, the configuration information of the DMRS comprises one or more of an antenna port group occupied by the DMRS, an occupied time-domain resource, an occupied frequency-domain resource, an occupied code-domain resource, a cyclic shift or an OCC.

In one subembodiment, the configuration information of the PTRS comprises one or more of an associated antenna port group for DMRS, an occupied antenna port group, an occupied time-domain resource, an occupied frequency-domain resource, time-domain density, frequency-domain density, an occupied code-domain resource, a cyclic shift or an Orthogonal Cover Code (OCC).

In one subembodiment, the third information is dynamically configured.

In one subembodiment, the third information belongs to DCI.

In one embodiment, the configuration information of the first radio signal comprises at least one of a periodical duration, a time-domain offset, an occupied time-domain resource, an occupied frequency-domain resource, an occupied code-domain resource, a cyclic shift, an Orthogonal Cover Code (OCC), an occupied antenna port group, a transmission sequence, adopted multi-antenna transmission or adopted multi-antenna reception.

In one subembodiment, the third information indicates periodic or semi-persistent SRS transmission.

In one subembodiment, the third information is semi-statically configured.

In one subembodiment, the third information is carried by a higher-layer signaling.

In one subembodiment, the periodical duration, the time-domain offset, the occupied time-domain resource and the occupied frequency-domain resource comprised by the configuration information of the first radio signal jointly determine a group of periodically occurring time-frequency resources, of which the occupied time-domain resource and the occupied frequency-domain resource are respectively a time-domain resource and a frequency-domain resource in a time-domain resource unit, and a time-frequency resource occupied by the first radio signal is a time-frequency resource among the group of periodically occurring time-frequency resources.

In one subembodiment, the periodical duration, the time-domain offset, the occupied time-domain resource and the occupied frequency-domain resource comprised by the configuration information of the first radio signal jointly determine a group of periodically occurring time-frequency resources, of which the occupied time-domain resource refers to a positive integer number of multicarrier symbol(s) comprised in a time-domain resource, while the occupied frequency-domain resource refers to a positive integer number of subcarrier(s) comprised in a time-domain resource, and a time-frequency resource occupied by the first radio signal is a time-frequency resource among the group of periodically occurring time-frequency resources.

In one subembodiment, the time-domain offset is measured by time-domain resource unit.

In one subembodiment, the time-domain offset is measured by ms.

In one subembodiment, the periodical duration is measured by time-domain resource unit.

In one subembodiment, the periodical duration is measured by ms.

In one embodiment, the configuration information of the first radio signal comprises at least one of an occupied time-domain resource, an occupied frequency-domain resource, an occupied code-domain resource, a cyclic shift, an OCC, an occupied antenna port group, a transmission sequence, an occupied antenna port group, a transmission sequence, adopted multi-antenna transmission or adopted multi-antenna reception.

In one subembodiment, the third information is semi-statically configured.

In one subembodiment, the third information is carried by a higher-layer signaling.

In one subembodiment, the above method also includes:
receiving sixth information;
herein, the sixth information is used for indicating configuration information of the first radio signal.

In one subembodiment, the sixth information is an aperiodic SRS trigger request.

In one subembodiment, the sixth information is dynamically configured.

In one subembodiment, the sixth information belongs to DCI.

In one subembodiment, the sixth information is used by the U02 for determining a time-domain resource occupied by the first radio signal.

In one subembodiment, the sixth information comprises a time-domain offset, and a time-domain resource occupied by the sixth information is used jointly with the time-domain offset comprised in the sixth information by the U02 for determining a time-domain resource occupied by the first radio signal.

In one subembodiment, a start time of transmission of the first radio signal is later than a start time of transmission of the sixth information, and a time offset between the start time of the transmission of the first radio signal and the start time of the transmission of the sixth information is equal to the time-domain offset comprised by the sixth information.

In one subembodiment, the time-domain resource occupied by the sixth information refers to a positive integer number of multicarrier symbol(s) in a time-domain resource unit, and the time-domain resource occupied by the first radio signal refers to a positive integer number of multicarrier symbol(s) in a time-domain resource unit; a time-domain resource unit in which the time-domain resource occupied by the sixth information is located is no later than a time-domain resource unit in which the time-domain resource occupied by the first radio signal is located, besides, a time offset between the time-domain resource unit in which the time-domain resource occupied by the first radio signal is located and the time-domain resource unit in which the time-domain resource occupied by the sixth information is located is equal to the time-domain offset comprised by the sixth information.

In one subembodiment, the time-domain offset is measured by time-domain resource unit.

In one subembodiment, the time-domain offset is measured by ms.

In one embodiment, the occupied antenna port group comprised by the configuration information of the first radio signal refers to an index of the occupied antenna port group among multiple antenna port groups.

In one embodiment, the occupied time-domain resource comprised by the configuration information of the first radio signal means that the occupied time-domain resource is a time-domain resource in a first time-domain resource unit.

In one subembodiment, the occupied time-domain resource comprised by the configuration information of the first radio signal means that the occupied time-domain resource is a positive integer number of multicarrier symbol(s) in a time-domain resource unit.

In one embodiment, the occupied frequency-domain resource comprised by the configuration information of the first radio signal means that occupied subcarrier(s) is(are) one or more subcarriers of multiple subcarriers.

In one embodiment, the occupied frequency-domain resource comprised by the configuration information of the first radio signal refers to (an) index(es) of occupied subcarrier(s) among multiple subcarriers.

In one embodiment, the occupied frequency-domain resource comprised by the configuration information of the first radio signal refers to occupied RB(s) and (a) subcarrier(s) occupied by each RB, the occupied RB(s) referring to one or more RBs of multiple RBs, and the subcarrier(s) occupied by each RB referring to one or more subcarriers of all subcarriers comprised by an RB.

In one embodiment, the occupied frequency-domain resource comprised by the configuration information of the first radio signal refers to index(es) of occupied RB(s) and index(es) of subcarrier(s) occupied by each RB, the index(es) of the occupied RB(s) referring to index(es) of the occupied RB(s) in multiple RBs, and the index(es) of subcarrier(s) occupied by each RB referring to index(es) of the subcarrier(s) occupied by each RB in all subcarriers comprised by an RB.

In one embodiment, the occupied frequency-domain resource comprised by the configuration information of the first radio signal refers to index(es) of occupied RB(s) as well as a comb and a subcarrier offset occupied by each RB, the index(es) of the occupied RB(s) referring to (an) index(es) of the occupied RB(s) in multiple RBs.

In one subembodiment, a comb C and a subcarrier offset cl occupied in a given RB represent occupying a group of evenly distributed subcarriers in the given RB, and a subcarrier spacing between any two adjacent subcarriers in the group of evenly distributed subcarriers is equal to the C, and a first subcarrier among the group of evenly distributed subcarriers is a (cl+1)-th subcarrier in the given RB, the C being a positive integer and the cl being an integer no less than 0 and less than the C.

In one subembodiment, a comb C and a subcarrier offset cl occupied in a given RB represent occupying a group of evenly distributed subcarriers in the given RB, and a subcarrier spacing between any two adjacent subcarriers in the group of evenly distributed subcarriers is equal to the C, and a last subcarrier among the group of evenly distributed subcarriers is a (cl+1)-th subcarrier in the given RB, the C being a positive integer and the cl being an integer no less than 0 and less than the C.

In one embodiment, the occupied code-domain resource comprised by the configuration information of the first radio signal means that an occupied characteristic sequence is a candidate characteristic sequence of multiple candidate characteristic sequences.

In one embodiment, the occupied code-domain resource comprised by the configuration information of the first radio signal refers to an index of an occupied characteristic sequence among multiple candidate characteristic sequences.

In one embodiment, the transmission sequence comprised by the configuration information of the first radio signal means that the transmission sequence employed is one of multiple transmission sequences.

In one embodiment, the transmission sequence comprised by the configuration information of the first radio signal refers to an index of the transmission sequence employed among multiple transmission sequences.

In one embodiment, the monitoring refers to blind detection, that is, receiving a signal and performing decoding; if the decoding is determined to be correct according to a Cyclic Redundancy Check (CRC) bit, it is determined that a given radio signal is transmitted within a given time-domain resource in a given sub-band; or if the decoding is determined to be incorrect according to a CRC bit, it is determined that the given radio signal is not transmitted within a given time-domain resource in a given sub-band.

In one subembodiment, the given time-domain resource in the given sub-band is a first time-domain resource in the first sub-band, and the given radio signal is the first radio signal.

In one subembodiment, the given time-domain resource in the given sub-band is a second time-domain resource in the second sub-band, and the given radio signal is the first reference signal.

In one embodiment, the monitoring refers to coherent detection, that is, performing coherent reception using an RS sequence of DMRS of a physical layer channel carrying the given radio signal and measuring energy of a signal obtained through the coherent detection. When the energy of the signal obtained through the coherent detection is greater than a first given threshold, it is determined that the given radio signal is transmitted within a given time-domain resource in a given sub-band; otherwise, it is determined that the given radio signal is not transmitted within the given time-domain resource in the given sub-band.

In one subembodiment, the given time-domain resource in the given sub-band is the first time-domain resource in the first sub-band, and the given radio signal is the first radio signal.

In one subembodiment, the given time-domain resource in the given sub-band is the second time-domain resource in the second sub-band, and the given radio signal is the first reference signal.

In one embodiment, the monitoring refers to energy detection, that is, sensing energy of a radio signal and averaging in time to acquire a received energy. When the received energy is greater than a second given threshold, it is determined that a given radio signal is transmitted within a given time-domain resource in a given sub-band; or when the received energy is no greater than a second given threshold, it is determined that the given radio signal is not transmitted within the given time-domain resource in the given sub-band.

In one subembodiment, the given time-domain resource in the given sub-band is the first time-domain resource in the first sub-band, and the given radio signal is the first radio signal.

In one subembodiment, the given time-domain resource in the given sub-band is the second time-domain resource in the second sub-band, and the given radio signal is the first reference signal.

In one embodiment, the monitoring refers to coherent detection, that is, performing coherent reception using a sequence of a given radio signal and measuring energy of a signal obtained through the coherent reception. When the energy of the signal obtained through the coherent detection is greater than a third given threshold, it is determined that the given radio signal is transmitted within a given time-domain resource in a given sub-band; otherwise, it is determined that the given radio signal is not transmitted within the given time-domain resource in the given sub-band.

In one subembodiment, the given time-domain resource in the given sub-band is the first time-domain resource in the first sub-band, and the given radio signal is the first radio signal.

In one subembodiment, the given time-domain resource in the given sub-band is the second time-domain resource in the second sub-band, and the given radio signal is the first reference signal.

In one embodiment, a given node determines whether a given radio signal is transmitted within a given time-domain resource in a given sub-band based on energy of a received signal on a given time-frequency resource.

In one subembodiment, the given node is the base station.

In one subembodiment, the given time-domain resource in the given sub-band is the first time-domain resource in the first sub-band, and the given radio signal is the first radio signal.

In one subembodiment, the given time-domain resource in the given sub-band is the second time-domain resource in the second sub-band, and the given radio signal is the first reference signal.

In one subembodiment, if the energy of the received signal on the given time-frequency resource is lower, the given node deems that the given radio signal is not transmitted within the given time-domain resource in the given sub-band; or if the energy of the received signal on the given time-frequency resource is higher, the given node deems that the given radio signal is transmitted within the given time-domain resource in the given sub-band.

In one subembodiment, if the energy of the received signal on the given time-frequency resource is lower than a reference energy threshold, the given node deems that the given radio signal is not transmitted within the given time-domain resource in the given sub-band; or if the energy of the received signal on the given time-frequency resource is not lower than a reference energy threshold, the given node deems that the given radio signal is transmitted within the given time-domain resource in the given sub-band; the reference energy threshold is configured by the given node autonomously.

In one embodiment, a given node determines whether a given radio signal is transmitted within a given time-domain resource in a given sub-band based on power of a received signal on a given time-frequency resource.

In one subembodiment, the given node is the base station.

In one subembodiment, the given time-domain resource in the given sub-band is the first time-domain resource in the first sub-band, and the given radio signal is the first radio signal.

In one subembodiment, the given time-domain resource in the given sub-band is the second time-domain resource in the second sub-band, and the given radio signal is the first reference signal.

In one subembodiment, if the power of the received signal on the given time-frequency resource is lower, the given node deems that the given radio signal is not transmitted within the given time-domain resource in the given sub-band; or if the power of the received signal on the given time-frequency resource is higher, the given node deems that the given radio signal is transmitted within the given time-domain resource in the given sub-band.

In one subembodiment, if the power of the received signal on the given time-frequency resource is lower than a reference power threshold, the given node deems that the given radio signal is not transmitted within the given time-domain resource in the given sub-band; or if the power of the received signal on the given time-frequency resource is not lower than a reference power threshold, the given node deems that the given radio signal is transmitted within the given time-domain resource in the given sub-band; the reference power threshold is configured by the given node autonomously.

In one embodiment, a given node determines whether a given radio signal is transmitted within a given time-domain resource in a given sub-band based on correlation between a given radio signal and a received signal on a given time-frequency resource.

In one subembodiment, the given node is the base station.

In one subembodiment, the given time-domain resource in the given sub-band is the first time-domain resource in the first sub-band, and the given radio signal is the first radio signal.

In one subembodiment, the given time-domain resource in the given sub-band is the second time-domain resource in the second sub-band, and the given radio signal is the first reference signal.

In one subembodiment, if the correlation between the given radio signal and the received signal on the given time-frequency resource is lower, the given node deems that the given radio signal is not transmitted within the given time-domain resource in the given sub-band; or if the correlation between the given radio signal and the received signal on the given time-frequency resource is higher, the given node deems that the given radio signal is transmitted within the given time-domain resource in the given sub-band.

In one subembodiment, if the correlation between the given radio signal and the received signal on the given time-frequency resource is lower than a reference correlation threshold, the given node deems that the given radio signal is not transmitted within the given time-domain resource in the given sub-band; or if the correlation between the given radio signal and the received signal on the given time-frequency resource is not lower than a reference correlation threshold, the given node deems that the given radio signal is transmitted within the given time-domain resource in the given sub-band; the reference correlation threshold is configured by the given node autonomously.

In one embodiment, a given node measures a received signal within a given time-domain resource in a given sub-band based on configuration parameters of a given radio signal to estimate a channel, and then determines based on the estimated channel whether the given radio signal is transmitted within the given time-domain resource in the given sub-band.

In one subembodiment, the given node is the base station.

In one subembodiment, the given time-domain resource in the given sub-band is the first time-domain resource in the first sub-band, and the given radio signal is the first radio signal.

In one subembodiment, the given time-domain resource in the given sub-band is the second time-domain resource in the second sub-band, and the given radio signal is the first reference signal.

In one subembodiment, if the estimated channel has lower energy, the given node deems that the given radio signal is not transmitted within the given time-domain resource in the given sub-band; or if the estimated channel has higher energy, the given node deems that the given radio signal is transmitted within the given time-domain resource in the given sub-band.

In one subembodiment, if energy of the estimated channel is lower than a reference channel energy threshold, the given node deems that the given radio signal is not transmitted within the given time-domain resource in the given sub-band; or if energy of the estimated channel is no lower than a reference channel energy threshold, the given node deems that the given radio signal is transmitted within the given time-domain resource in the given sub-band; the reference channel energy threshold is configured by the given node autonomously.

In one subembodiment, if the estimated channel has lower power, the given node deems that the given radio signal is not transmitted within the given time-domain resource in the given sub-band; or if the estimated channel has higher power, the given node deems that the given radio signal is transmitted within the given time-domain resource in the given sub-band.

In one subembodiment, if power of the estimated channel is lower than a reference channel power threshold, the given node deems that the given radio signal is not transmitted within the given time-domain resource in the given sub-band; or if power of the estimated channel is no lower than a reference channel power threshold, the given node deems that the given radio signal is transmitted within the given time-domain resource in the given sub-band; the reference channel power threshold is configured by the given node autonomously.

In one subembodiment, if properties of the estimated channel are not consistent with those expected by the given node, the given node deems that the given radio signal is not transmitted within the given time-domain resource in the given sub-band; otherwise, the given node deems that the given radio signal is transmitted within the given time-domain resource in the given sub-band.

Embodiment 6

Figure 6:
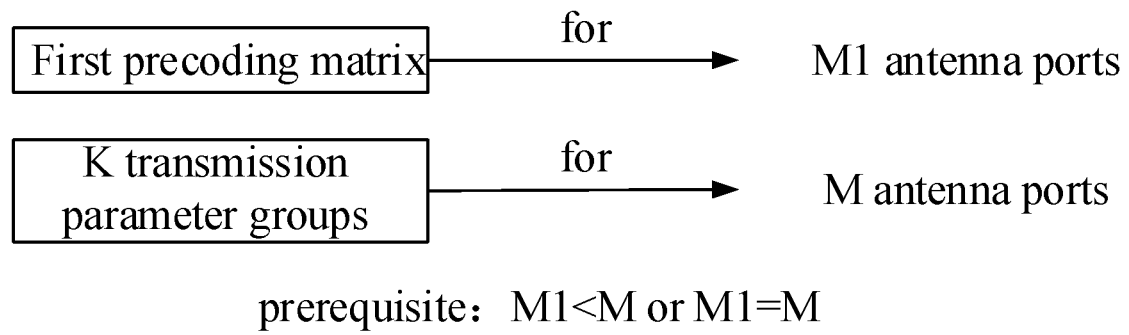
FIG. 6 illustrates a schematic diagram of a first precoding matrix and K transmission parameter groups according to one embodiment of the present disclosure.

Embodiment 6 illustrates a schematic diagram of a first precoding matrix and K transmission parameter groups, as shown in FIG. 6.

In Embodiment 6, the first precoding matrix is for M1 antenna ports, while each of the K transmission parameter groups are for M antenna ports, M being a positive integer greater than 1, and M1 being a positive integer greater than 1, and the M1 is no greater than the M.

In one embodiment, the M1 is less than the M.

In one embodiment, the M1 is equal to the M.

In one embodiment, the M1 is dynamically configured by a physical layer signaling.

In one embodiment, the M1 is configured by a higher-layer signaling.

In one embodiment, the M1 is pre-defined.

In one embodiment, the M is dynamically configured by a physical layer signaling.

In one embodiment, the M is configured by a higher-layer signaling.

In one embodiment, the phrase that the first precoding matrix is for M1 antenna ports means that a quantity of row vectors comprised by the first precoding matrix is the M1.

In one embodiment, the phrase that the first precoding matrix is for M1 antenna ports means that the first precoding matrix is a precoding matrix in a M1-antenna-port codebook, the M1-antenna-port codebook comprising a positive integer number of precoding matrix(es), and a quantity of row vectors comprised by each precoding matrix in the M1-antenna-port codebook is the M1.

In one embodiment, the phrase that the first precoding matrix is for M1 antenna ports means that the first precoding matrix is used for generating the M1 antenna ports.

In one subembodiment, a transmission beam on the M1 antenna ports is generated by the first precoding matrix.

In one subembodiment, a transmission beamforming matrix on the M1 antenna ports is generated by the first precoding matrix.

In one subembodiment, a transmission beamforming matrix on the M1 antenna ports is the first precoding matrix.

In one subembodiment, a transmission beamforming vector on the M1 antenna ports is generated by the first precoding matrix.

In one subembodiment, a transmission beamforming vector on the M1 antenna ports is the first precoding matrix, i.e., a quantity of column vector(s) comprised by the first precoding matrix is 1.

In one subembodiment, Spatial Tx parameters of the M1 antenna ports are generated by the first precoding matrix.

In one subembodiment, Tx spatial filtering on the M1 antenna ports is generated by the first precoding matrix.

In one embodiment, the phrase that the K transmission parameter groups are for M antenna ports means that the K transmission parameter groups respectively comprise K precoding matrixes, and a quantity of row vectors comprised by each of the K precoding matrixes is the M.

In one embodiment, the phrase that the K transmission parameter groups are for M antenna ports means that the K transmission parameter groups respectively comprise K precoding matrixes, and each of the K precoding matrixes is a precoding matrix in a M-antenna-port codebook, the M-antenna-port codebook comprising J precoding matrixes, and a quantity of row vectors comprised by each of the J precoding matrixes is the M, J being a positive integer no less than the K.

In one embodiment, the phrase that the K transmission parameter groups are for M antenna ports means that a given transmission parameter group is any transmission parameter group of the K transmission parameter groups, and the given transmission parameter group is used for generating M antenna ports.

In one subembodiment, the given transmission parameter group comprises a transmission beam on the M antenna ports.

In one subembodiment, the given transmission parameter group comprises a transmission beamforming matrix on the M antenna ports.

In one subembodiment, the given transmission parameter group comprises a transmission beamforming vector on the M antenna ports.

In one subembodiment, the given transmission parameter group comprises Spatial Tx parameters on the M antenna ports.

In one subembodiment, the given transmission parameter group comprises a Tx spatial filtering on the M antenna ports.

Embodiment 7

Figure 7:
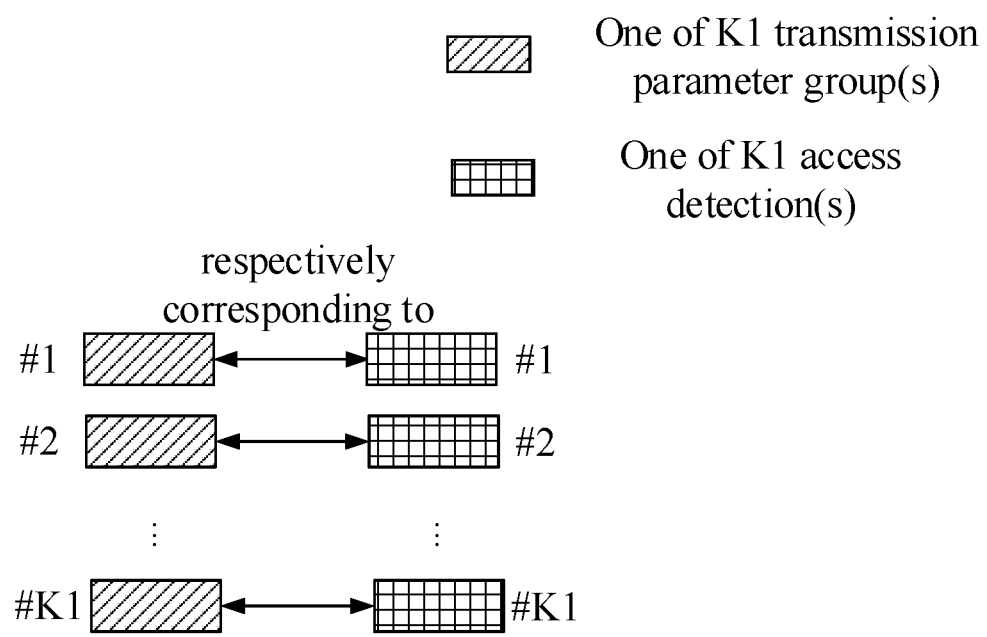
FIG. 7 illustrates a schematic diagram of K1 transmission parameter group(s) respectively being used for K1 access detection(s) according to one embodiment of the present disclosure.

Embodiment 7 illustrates a schematic diagram of K1 transmission parameter group(s) respectively being used for K1 access detection(s), as shown in FIG. 7.

In Embodiment 7, the K1 transmission parameter group(s) is(are) respectively used for the K1 access detection(s), and the K1 access detection(s) is(are) respectively used for determining whether wireless transmission can be performed via the given transmission parameter group within the first time-domain resource in the first sub-band in the present disclosure.

In one embodiment, the phrase that a given transmission parameter group is used for a given access detection means that a reception parameter group of the given access detection comprises the given transmission parameter group.

In one subembodiment, the given transmission parameter group is one of the K1 transmission parameter group(s), and the given access detection is one of the K1 access detection(s) that corresponds to the given transmission parameter group.

In one embodiment, the phrase that a given transmission parameter group is used for a given access detection means that a reception parameter group of the given access detection is the same as the given transmission parameter group.

In one subembodiment, the given transmission parameter group is one of the K1 transmission parameter group(s), and the given access detection is one of the K1 access detection(s) that corresponds to the given transmission parameter group.

In one embodiment, the phrase that a given transmission parameter group is used for a given access detection means that a reception parameter group of the given access detection comprises the given transmission parameter group, but also reception parameters not belonging to the given transmission parameter group.

In one subembodiment, the given transmission parameter group is one of the K1 transmission parameter group(s), and the given access detection is one of the K1 access detection(s) that corresponds to the given transmission parameter group.

In one embodiment, the phrase that a given transmission parameter group is used for a given access detection means that the given transmission parameter group can be used to infer a reception parameter group of the given access detection.

In one subembodiment, the given transmission parameter group is one of the K1 transmission parameter group(s), and the given access detection is one of the K1 access detection(s) that corresponds to the given transmission parameter group.

In one embodiment, the phrase that a given transmission parameter group is used for a given access detection means that the given transmission parameter group comprises a transmission beamforming matrix, and a beam width corresponding to the transmission beamforming matrix is no larger than a beam width corresponding to a reception beamforming matrix of the given access detection.

In one subembodiment, the given transmission parameter group is one of the K1 transmission parameter group(s), and the given access detection is one of the K1 access detection(s) that corresponds to the given transmission parameter group.

In one embodiment, the phrase that a given transmission parameter group is used for a given access detection means that the given transmission parameter group comprises a transmission beamforming matrix, and a beam width corresponding to the transmission beamforming matrix is equal to a beam width corresponding to a reception beamforming matrix of the given access detection.

In one subembodiment, the given transmission parameter group is one of the K1 transmission parameter group(s), and the given access detection is one of the K1 access detection(s) that corresponds to the given transmission parameter group.

In one embodiment, the phrase that a given transmission parameter group is used for a given access detection means that the given transmission parameter group comprises a transmission beamforming matrix, and a beam direction corresponding to the transmission beamforming matrix is included by a beam direction corresponding to a reception beamforming matrix of the given access detection.

In one subembodiment, the given transmission parameter group is one of the K1 transmission parameter group(s), and the given access detection is one of the K1 access detection(s) that corresponds to the given transmission parameter group.

In one embodiment, the phrase that a given transmission parameter group is used for a given access detection means that the given transmission parameter group comprises a transmission beamforming matrix, and a beam direction corresponding to the transmission beamforming matrix is the same as a beam direction corresponding to a reception beamforming matrix of the given access detection.

In one subembodiment, the given transmission parameter group is one of the K1 transmission parameter group(s), and the given access detection is one of the K1 access detection(s) that corresponds to the given transmission parameter group.

In one embodiment, the phrase that a given transmission parameter group is used for a given access detection means that the given transmission parameter group comprises a transmission beam, and a beam width corresponding to the transmission beam is no larger than a beam width corresponding to a reception beam of the given access detection.

In one subembodiment, the given transmission parameter group is one of the K1 transmission parameter group(s), and the given access detection is one of the K1 access detection(s) that corresponds to the given transmission parameter group.

In one embodiment, the phrase that a given transmission parameter group is used for a given access detection means that the given transmission parameter group comprises a transmission beam, and a beam width corresponding to the transmission beam is equal to a beam width corresponding to a reception beam of the given access detection.

In one subembodiment, the given transmission parameter group is one of the K1 transmission parameter group(s), and the given access detection is one of the K1 access detection(s) that corresponds to the given transmission parameter group.

In one embodiment, the phrase that a given transmission parameter group is used for a given access detection means that the given transmission parameter group comprises a transmission beam, and the transmission beam is comprised by a reception beam of the given access detection.

In one subembodiment, the given transmission parameter group is one of the K1 transmission parameter group(s), and the given access detection is one of the K1 access detection(s) that corresponds to the given transmission parameter group.

In one embodiment, the phrase that a given transmission parameter group is used for a given access detection means that the given transmission parameter group comprises a transmission beam, and the transmission beam is the same as a reception beam of the given access detection.

In one subembodiment, the given transmission parameter group is one of the K1 transmission parameter group(s), and the given access detection is one of the K1 access detection(s) that corresponds to the given transmission parameter group.

In one embodiment, a reception parameter group of the given access detection comprises Spatial Rx parameters.

In one subembodiment, the given access detection is any access detection of the K1 access detection(s).

In one embodiment, a reception parameter group of the given access detection comprises a reception beam.

In one subembodiment, the given access detection is any access detection of the K1 access detection(s).

In one embodiment, a reception parameter group of the given access detection comprises a reception beamforming matrix.

In one subembodiment, the given access detection is any access detection of the K1 access detection(s).

In one embodiment, a reception parameter group of the given access detection comprises a reception analog beamforming matrix.

In one subembodiment, the given access detection is any access detection of the K1 access detection(s).

In one embodiment, a reception parameter group of the given access detection comprises a reception beamforming vector.

In one subembodiment, the given access detection is any access detection of the K1 access detection(s).

In one embodiment, a reception parameter group of the given access detection comprises a Rx spatial filtering.

In one subembodiment, the given access detection is any access detection of the K1 access detection(s).

In one embodiment, the reception beam is a reception analog beam.

In one embodiment, the reception beam is a reception digital beam.

In one embodiment, the reception beam is a reception hybrid analog and digital beam.

In one embodiment, the reception beamforming matrix comprises more than one column vector.

In one embodiment, the reception beamforming matrix comprises one column vector, i.e., the reception beamforming matrix is a reception beamforming vector.

In one embodiment, the reception beamforming matrix is a reception analog beamforming matrix.

In one embodiment, the reception beamforming matrix is a reception digital beamforming matrix.

In one embodiment, the reception beamforming matrix is a reception hybrid analog and digital beamforming matrix.

In one embodiment, the reception beamforming vector is a reception analog beamforming vector.

In one embodiment, the reception beamforming vector is a reception digital beamforming vector.

In one embodiment, the reception beamforming vector is a reception hybrid analog and digital beamforming vector.

Embodiment 8

Figure 8:
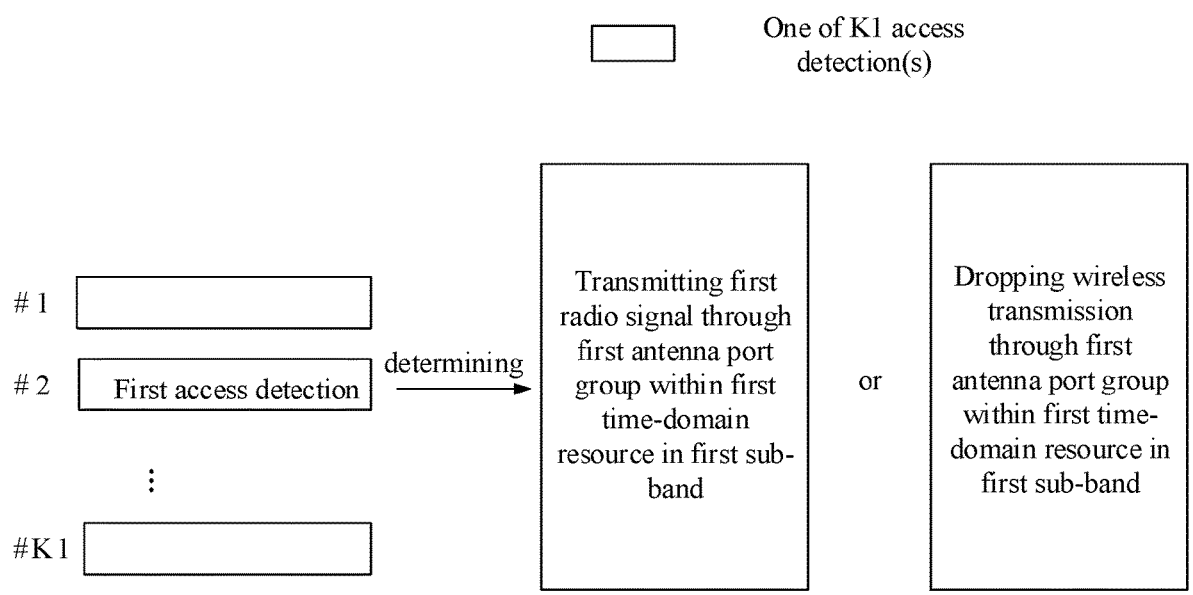
FIG. 8 illustrates a schematic diagram of a first access detection according to one embodiment of the present disclosure.

Embodiment 8 illustrates a schematic diagram of a first access detection, as shown in FIG. 8.

In Embodiment 8, the first access detection is one of the K1 access detection(s) in the present disclosure corresponding to the first transmission parameter group in the present disclosure, and the first access detection is used for determining whether wireless transmission can be performed via the given transmission parameter group within the first time-domain resource in the first sub-band in the present disclosure; if yes, the first radio signal in the present disclosure is transmitted through the first antenna port group within a first time-domain resource in the first sub-band; if no, wireless transmission through the first antenna port group is dropped within the first time-domain resource in the first sub-band; the first transmission parameter group is used for generating the first antenna port group.

In one embodiment, the first access detection comprises performing Q energy detection(s) respectively in Q time sub-pool(s) on the first sub-band, through which Q detection value(s) is(are) obtained, Q being a positive integer; an end time of the Q time sub-pool(s) is no later than a start time of a first time-domain resource in the first sub-band; if each of Q1 detection value(s) of the Q detection value(s) is lower than a first reference threshold, the first radio signal is transmitted through the first antenna port group within a first time-domain resource in the first sub-band; or if not each of Q1 detection value(s) of the Q detection value(s) is lower than a first reference threshold, wireless transmission through the first antenna port group is dropped within the first time-domain resource in the first sub-band; Q1 being a positive integer no greater than the Q.

In one subembodiment, the first antenna port group is spatially correlated with any of the Q energy detection(s).

Embodiment 9

Figure 9:
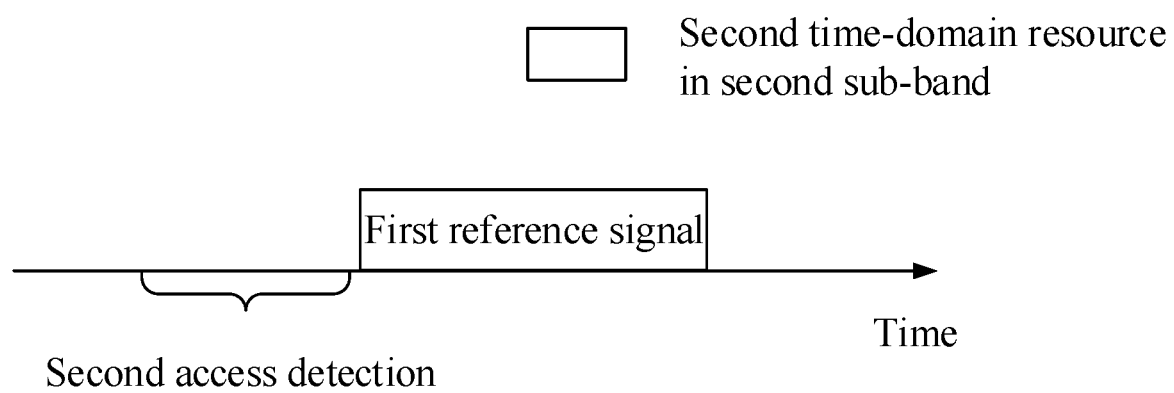
FIG. 9 illustrates a schematic diagram of a second access detection according to one embodiment of the present disclosure.

Embodiment 9 illustrates a schematic diagram of a second access detection, as shown in FIG. 9.

In Embodiment 9, the UE in the present disclosure performs the second access detection to determine that the first reference signal in the present disclosure is transmitted through the M2 antenna port(s) in the present disclosure within a second time-domain resource in a second sub-band;

an end time of the second access detection is no later than a start time of the second time-domain resource in the second sub-band.

In one embodiment, the second sub-band comprises the first sub-band.

In one embodiment, the second sub-band is entirely overlapped with the first sub-band.

In one embodiment, the second sub-band comprises the first sub-band, and also frequency-domain resources not belonging to the first sub-band.

In one embodiment, a start time of a second time-domain resource in the second sub-band is ahead of a start time of a first time-domain resource in the first sub-band.

In one embodiment, an end time of a second time-domain resource in the second sub-band is ahead of a start time of a first time-domain resource in the first sub-band.

In one embodiment, the second access detection comprises performing P energy detection(s) respectively in P time sub-pool(s) on the second sub-band, through which P detection value(s) is(are) obtained, P being a positive integer; an end time of the P time sub-pool(s) is no later than a start time of a second time-domain resource in the second sub-band; each of P1 detection value(s) of the P detection value(s) is lower than the first reference threshold, P1 being a positive integer no greater than the P.

In one embodiment, the M2 antenna port(s) is(are) spatially correlated with any energy detection of the P energy detection(s).

In one embodiment, a time-domain duration of a second time-domain resource in the second sub-band is no greater than Max Channel Occupy Time (MCOT) of the second sub-band.

In one embodiment, a time-domain duration of a second time-domain resource in the second sub-band is no greater than Max Channel Occupy Time (MCOT).

In one embodiment, a time-domain duration of a second time-domain resource in the second sub-band is no greater than a Max Channel Occupy Time (MCOT) of the second sub-band.

In one embodiment, a time-domain duration of a second time-domain resource in the second sub-band is no greater than a Max Channel Occupy Time (MCOT).

In one embodiment, a second time-domain resource in the second sub-band comprises a positive integer number of time unit(s) in time domain.

In one subembodiment, the positive integer number of time units comprised by the second time-domain resource in the second sub-band are consecutive in time domain.

In one subembodiment, at least two time units of the positive integer number of time units comprised by the second time-domain resource in the second sub-band are consecutive in time domain.

In one subembodiment, at least two time units of the positive integer number of time units comprised by the second time-domain resource in the second sub-band are non-consecutive in time domain.

In one subembodiment, the time unit is a Subframe.
In one subembodiment, the time unit is a Slot.
In one subembodiment, the time unit is a mini-Slot.
In one subembodiment, the time unit comprises a positive integer number of multicarrier symbol(s).

In one embodiment, the second time-domain resource in the second sub-band comprises a time unit in time domain.
In one subembodiment, the time unit is a Subframe.
In one subembodiment, the time unit is a Slot.
In one subembodiment, the time unit is a mini-Slot.

In one subembodiment, the time unit comprises a positive integer number of multicarrier symbol(s).

In one embodiment, the second time-domain resource in the second sub-band belongs to a time unit in time domain.
In one subembodiment, the time unit is a Subframe.
In one subembodiment, the time unit is a Slot.
In one subembodiment, the time unit is a mini-Slot.
In one subembodiment, the time unit comprises a positive integer number of multicarrier symbol(s).

In one embodiment, the second time-domain resource in the second sub-band comprises a positive integer number of multicarrier symbol(s) in time domain.

In one embodiment, the second sub-band comprises frequency-domain resources reserved for the first reference signal.

In one embodiment, the second sub-band comprises frequency-domain resources occupied by the first reference signal.

In one embodiment, frequency-domain resources reserved for the first reference signal comprises a positive integer number of subcarrier(s).

In one embodiment, frequency-domain resources occupied by the first reference signal comprises a positive integer number of subcarrier(s).

In one embodiment, the second time-domain resource in the second sub-band comprises time-domain resources reserved for the first reference signal.

In one embodiment, the second time-domain resource in the second sub-band comprises time-domain resources occupied by the first reference signal.

In one embodiment, time-domain resources reserved for the first reference signal comprises a positive integer number of multicarrier symbol(s).

In one embodiment, time-domain resources occupied by the first reference signal comprises a positive integer number of multicarrier symbol(s).

In one embodiment, a start time of the second time-domain resource in the second sub-band is a start time of transmission of the first reference signal.

In one embodiment, a start time of the second time-domain resource in the second sub-band is a start time of time-domain resources reserved for the first reference signal.

In one embodiment, a starting multicarrier symbol of the second time-domain resource in the second sub-band is a starting multicarrier symbol of time-domain resources reserved for the first reference signal.

Embodiment 10

Figure 10:
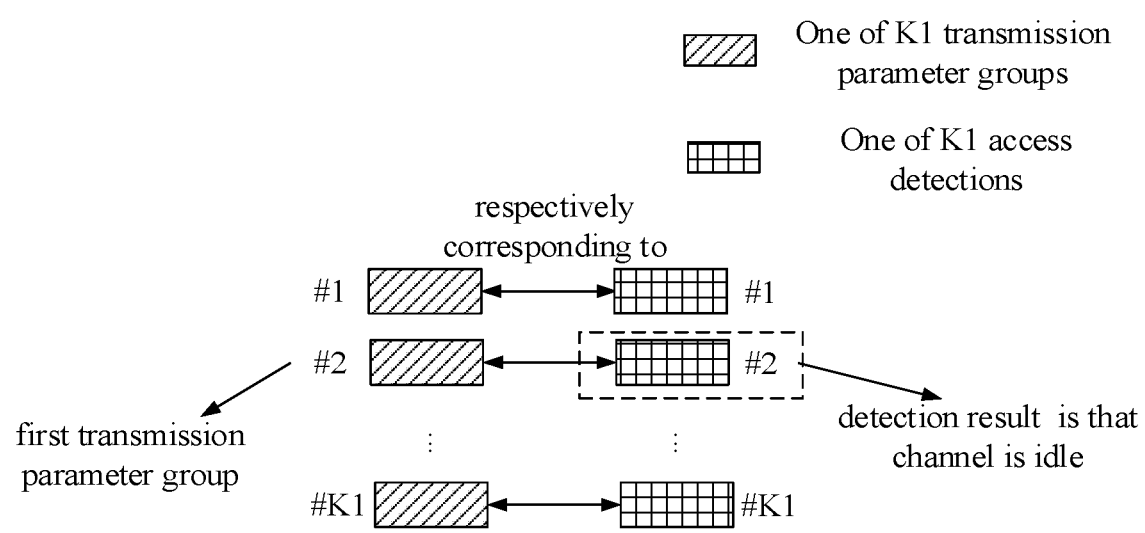
FIG. 10 illustrates a schematic diagram of K1 access detections being used for determining a first transmission parameter group out of K1 transmission parameter groups according to one embodiment of the present disclosure.

Embodiment 10 illustrates a schematic diagram of K1 access detections being used for determining a first transmission parameter group out of K1 transmission parameter groups, as shown in FIG. 10.

In Embodiment 10, the UE in the present disclosure transmits the first radio signal in the present disclosure through the first antenna port group in the present disclosure within a first time-domain resource in the first sub-band in the present disclosure; K1 is greater than 1, the K1 access detections being used for determining the first transmission parameter group out of the K1 transmission parameter groups.

In one embodiment, a first access detection is one of the K1 access detections that corresponds to the first transmission parameter group, and the first access detection indicates that the first radio signal can be transmitted through the first antenna port group within a first time-domain resource in the first sub-band, the first transmission parameter group being used for generating the first antenna port group.

In one embodiment, the first transmission parameter group is a reception parameter group out of the K1 transmission parameter groups, of which a corresponding access detection of the K1 access detections yields a result of channel idleness.

In one embodiment, the first transmission parameter group is one and only reception parameter group out of the K1 transmission parameter groups, of which a corresponding access detection of the K1 access detections yields a result of channel idleness.

In one embodiment, the UE autonomously determines the first transmission parameter group out of the K1 transmission parameter groups.

In one embodiment, the UE arbitrarily selects a transmission parameter group from the K1 transmission parameter groups as the first transmission parameter group.

In one embodiment, how to determine the first transmission parameter group out of the K1 transmission parameter groups is related to the implementation of the UE, namely, there is no need for standardization.

In one embodiment, the first transmission parameter group is one of the K1 transmission parameter groups, of which a corresponding access detection yielding a smallest energy detection result out of the K1 access detections.

In one subembodiment, the energy detection result of the access detection is an average of detection value(s) of q energy detection(s) in the access detection, q being a positive integer.

In one subembodiment, the energy detection result of the access detection is a sum of detection value(s) of q energy detection(s) in the access detection, q being a positive integer.

In one subembodiment, the energy detection result of the access detection is an average of q largest detection value(s) out of detection values of energy detections in the access detection, q being a positive integer.

In one subembodiment, the energy detection result of the access detection is a sum of q largest detection value(s) out of detection values of energy detections in the access detection, q being a positive integer.

In one subembodiment, the energy detection result of the access detection is an average of detection values of energy detections in the access detection.

In one subembodiment, the energy detection result of the access detection is a sum of detection values of energy detections in the access detection.

Embodiment 11

Figure 11:
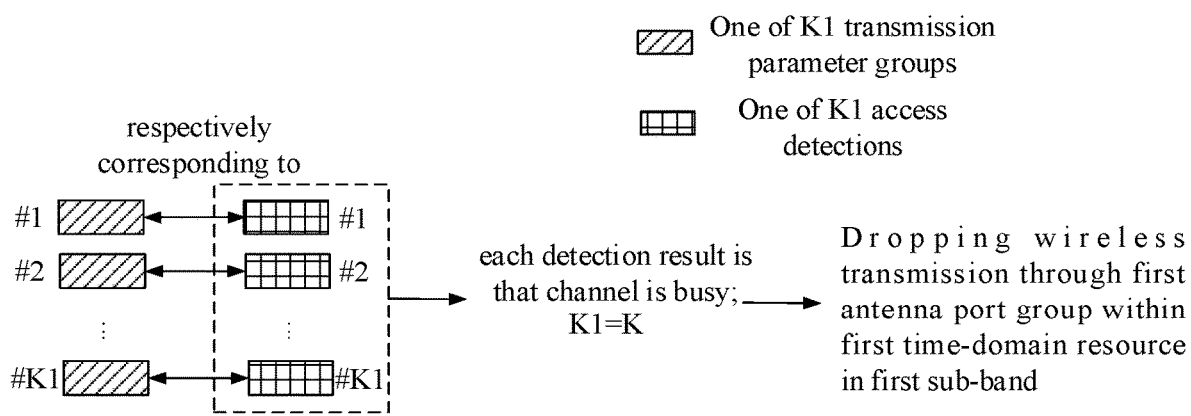
FIG. 11 illustrates a schematic diagram of determining to drop wireless transmission through a first antenna port group within a first time-domain resource in a first sub-band according to one embodiment of the present disclosure.

Embodiment 11 illustrates a schematic diagram of determining to drop wireless transmission through a first antenna port group within a first time-domain resource in a first sub-band, as shown in FIG. 11.

In Embodiment 11, the UE in the present disclosure drops wireless transmission through the first antenna port group within a first time-domain resource in the first sub-band; the K1 in the present disclosure is equal to the K in the present disclosure; each of the K1 access detections in the present disclosure indicates that wireless transmission cannot be performed via a corresponding transmission parameter group within a first time-domain resource in the first sub-band.

In one embodiment, a detection result of each of the K1 access detections is that a channel is busy.

Embodiment 12

Figure 12:
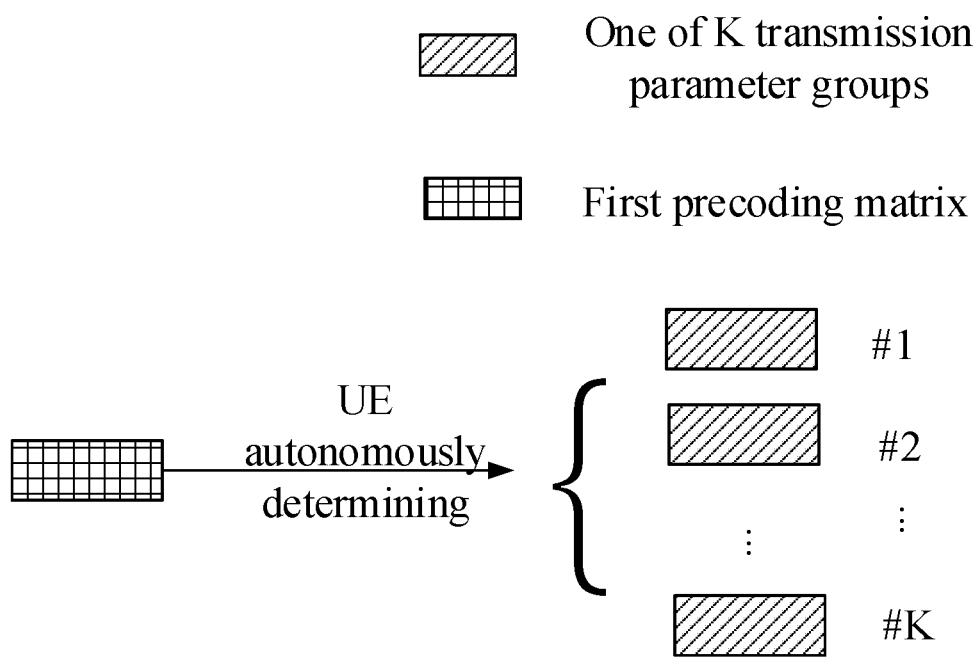
FIG. 12 illustrates a schematic diagram of determining K transmission parameter groups according to one embodiment of the present disclosure.

Embodiment 12 illustrates a schematic diagram of determining K transmission parameter groups, as shown in FIG. 12.

In Embodiment 12, the UE in the present disclosure autonomously determines the K transmission parameter groups based on the first precoding matrix.

In one embodiment, the K transmission parameter groups are related to implementation of the UE, namely, there is no need for standardization.

In one embodiment, the action of determining the K transmission parameter groups based on the first precoding matrix means that the first precoding matrix is used to infer the K transmission parameter groups.

In one embodiment, the action of determining the K transmission parameter groups based on the first precoding matrix means that a transmission parameter group generated by the first precoding matrix comprises any transmission parameter group of the K transmission parameter groups.

In one embodiment, the action of determining the K transmission parameter groups based on the first precoding matrix means that each of the K transmission parameter groups comprises a transmission beamforming matrix, and a beam width corresponding to the transmission beamforming matrix comprised by each of the K transmission parameter groups is no larger than that of a transmission beam generated by the first precoding matrix.

In one embodiment, the action of determining the K transmission parameter groups based on the first precoding matrix means that each of the K transmission parameter groups comprises a transmission beamforming matrix, and a beam width corresponding to the transmission beamforming matrix comprised by each of the K transmission parameter groups is smaller than that of a transmission beam generated by the first precoding matrix.

In one embodiment, the action of determining the K transmission parameter groups based on the first precoding matrix means that each of the K transmission parameter groups comprises a transmission beamforming matrix, and a beam direction corresponding to the transmission beamforming matrix comprised by each of the K transmission parameter groups is included by that of a transmission beam generated by the first precoding matrix.

In one embodiment, the action of determining the K transmission parameter groups based on the first precoding matrix means that each of the K transmission parameter groups comprises a transmission beam, and a beam width of the transmission beam comprised by each of the K transmission parameter groups is no larger than that of a transmission beam generated by the first precoding matrix.

In one embodiment, the action of determining the K transmission parameter groups based on the first precoding matrix means that each of the K transmission parameter groups comprises a transmission beam, and a beam width of the transmission beam comprised by each of the K transmission parameter groups is smaller than that of a transmission beam generated by the first precoding matrix.

In one embodiment, the action of determining the K transmission parameter groups based on the first precoding matrix means that each of the K transmission parameter groups comprises a transmission beam, and the transmission beam comprised by each of the K transmission parameter groups is comprised by a transmission beam generated by the first precoding matrix.

Embodiment 13

Figure 13A:
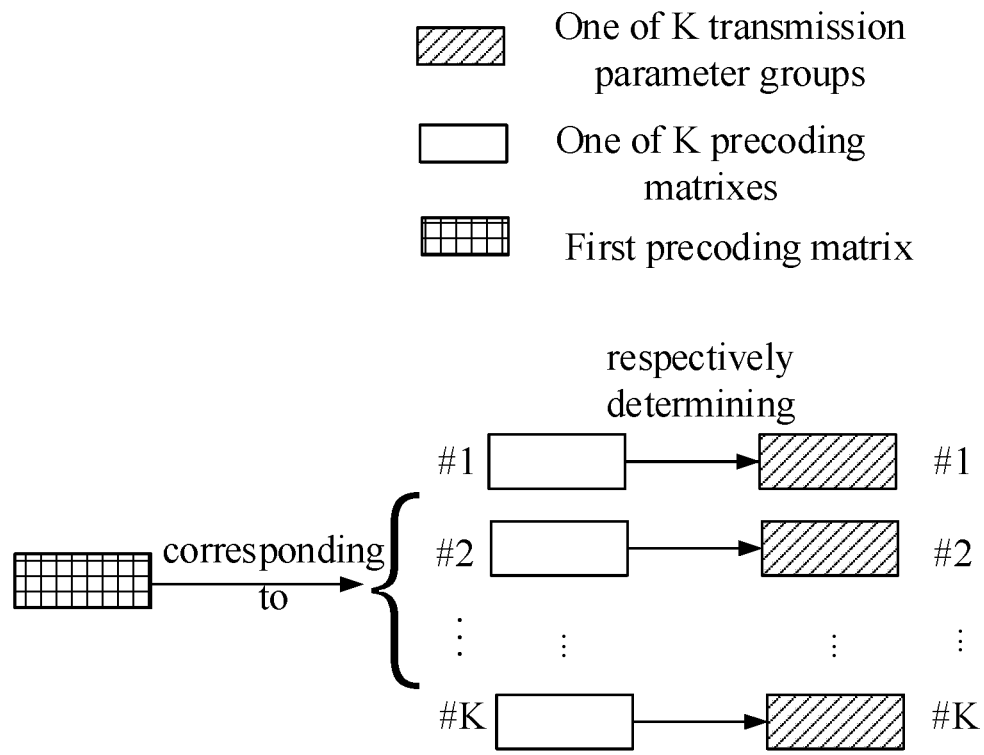
FIG. 13A-FIG. 13B respectively illustrate a schematic diagram of determining K transmission parameter groups according to another embodiment of the present disclosure.
Figure 13B:
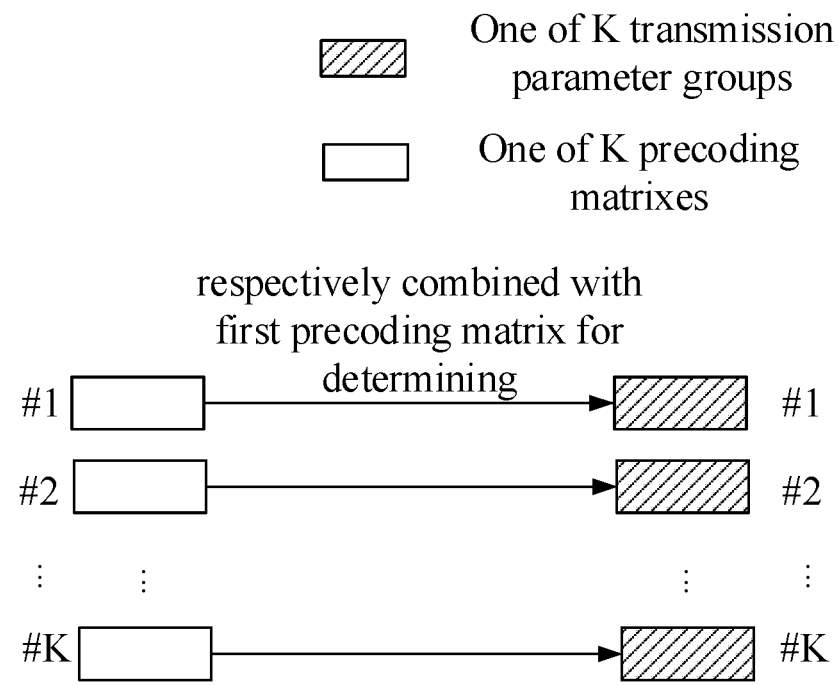

Embodiment 13 A-Embodiment 13B respectively illustrate another schematic diagram of determining K transmission parameter groups, as shown in FIG. 13.

In Embodiment 13, the first precoding matrix corresponds to K precoding matrixes, and the K precoding matrixes are used for determining the K transmission parameter groups, the K precoding matrixes being pre-defined or configurable.

In one embodiment, a number of column vector(s) comprised by each of the K precoding matrixes is equal to a rank of the first radio signal, the first radio signal comprising data.

In one embodiment, among the first precoding matrix and the K precoding matrixes only the K precoding matrixes are used for determining the K transmission parameter groups.

In one subembodiment, the M1 is less than the M.

In one subembodiment, the M1 is equal to the M.

In one subembodiment, the K transmission parameter groups are respectively generated by the K precoding matrixes.

In one subembodiment, a quantity of row vectors comprised in each of the K precoding matrixes is no smaller than that comprised in the first precoding matrix.

In one subembodiment, a quantity of row vectors comprised in each of the K precoding matrixes is equal to the M.

In one subembodiment, each of the K precoding matrixes is a precoding matrix in a M-antenna-port codebook, the M-antenna-port codebook comprising J precoding matrixes, and a quantity of row vectors comprised by each of the J precoding matrixes is the M, J being a positive integer no less than the K.

In one subembodiment, each of the K transmission parameter groups comprises a transmission beam.

In one subembodiment, each of the K transmission parameter groups comprises a transmission beamforming matrix.

In one subembodiment, each of the K transmission parameter groups comprises a transmission beamforming matrix, the K transmission parameter groups being the K precoding matrixes respectively.

In one subembodiment, each of the K transmission parameter groups comprises a transmission beamforming vector.

In one subembodiment, each of the K transmission parameter groups comprises a transmission beamforming vector, the K transmission parameter groups being the K precoding matrixes respectively, and each of the K precoding matrixes comprises one column vector.

In one subembodiment, each of the K transmission parameter groups comprises Spatial Tx parameters.

In one subembodiment, each of the K transmission parameter groups comprises a Tx spatial filtering.

In one embodiment, the K precoding matrixes and the first precoding matrix are jointly used for determining the K transmission parameter groups.

In one subembodiment, the M1 is equal to the M.

In one subembodiment, the K transmission parameter groups are respectively generated by the K precoding matrixes jointly with the first precoding matrix.

In one subembodiment, each of the K precoding matrixes is a precoding matrix in a M-antenna-port codebook, the M-antenna-port codebook comprising J1 precoding matrixes, and a quantity of row vectors comprised by each of the J1 precoding matrixes is J2, J1 being a positive integer no less than the K and J2 being a positive integer greater than 1.

In one subembodiment, K target precoding matrixes are products obtained by respectively multiplying the first precoding matrix by the K precoding matrixes, and a quantity of row vectors comprised by each of the K target precoding matrixes is equal to the M; the K transmission parameter group are respectively generated by the K target precoding matrixes.

In one subembodiment, a quantity of row vectors comprised by each of the K precoding matrixes is equal to a quantity of column vectors comprised by the first precoding matrix.

In one subembodiment, each of the K transmission parameter groups comprises a transmission beam.

In one subembodiment, each of the K transmission parameter groups comprises a transmission beamforming matrix.

In one subembodiment, each of the K transmission parameter groups comprises a transmission beamforming matrix, the K transmission parameter groups being the K target precoding matrixes respectively.

In one subembodiment, each of the K transmission parameter groups comprises a transmission beamforming vector.

In one subembodiment, each of the K transmission parameter groups comprises a transmission beamforming vector, the K transmission parameter groups being the K target precoding matrixes respectively, and each of the K target precoding matrixes comprises one column vector.

In one subembodiment, each of the K transmission parameter groups comprises Spatial Tx parameters.

In one subembodiment, each of the K transmission parameter groups comprises a Tx spatial filtering.

In one embodiment, the K precoding matrixes are pre-defined.

In one embodiment, the K precoding matrixes are configurable.

In one embodiment, the above method includes:
receiving fourth information;
herein, the fourth information is used for determining that the first precoding matrix corresponds to the K precoding matrixes.

In one embodiment, the K precoding matrixes are configured by the fourth information.

In one embodiment, the fourth information explicitly indicates that the first precoding matrix corresponds to the K precoding matrixes.

In one embodiment, the fourth information implicitly indicates that the first precoding matrix corresponds to the K precoding matrixes.

In one embodiment, the fourth information is semi-statically configured.

In one embodiment, the fourth information is carried by a higher-layer signaling.

In one embodiment, the fourth information is carried by an RRC signaling.

In one embodiment, the fourth information is all or part of an IE in an RRC signaling.

In one embodiment, the first information and the fourth information belong to a same IE in an RRC signaling.

In one embodiment, the first information and the fourth information respectively belong to different IEs in an RRC signaling.

In one embodiment, the fourth information is carried by a MAC CE signaling.

In one embodiment, the fourth information is carried by a broadcast signaling.

In one embodiment, the fourth information is system information.

In one embodiment, the fourth information is transmitted in a SIB.

In one embodiment, the fourth information is transmitted on the first sub-band.

In one embodiment, the fourth information is transmitted on a frequency band other than the first sub-band.

In one embodiment, the fourth information is transmitted on a frequency band deployed at Licensed Spectrum other than the first sub-band.

In one embodiment, the fourth information is transmitted on a frequency band deployed at Unlicensed Spectrum other than the first sub-band.

In one embodiment, the fourth information is transmitted on a frequency band deployed at Licensed Spectrum.

In one embodiment, the fourth information is transmitted on a frequency band deployed at Unlicensed Spectrum.

In one embodiment, the fourth information is transmitted on a downlink physical layer data channel (i.e., a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, the Embodiment 13A corresponds to a schematic diagram of determining K transmission parameter groups, where only the K precoding matrixes among the first precoding matrix and the K precoding matrixes are used for determining the K transmission parameter groups.

In one embodiment, the Embodiment 13B corresponds to a schematic diagram of determining K transmission parameter groups, where the first precoding matrix and the K precoding matrixes are jointly used for determining the K transmission parameter groups.

Embodiment 14

Figure 14:
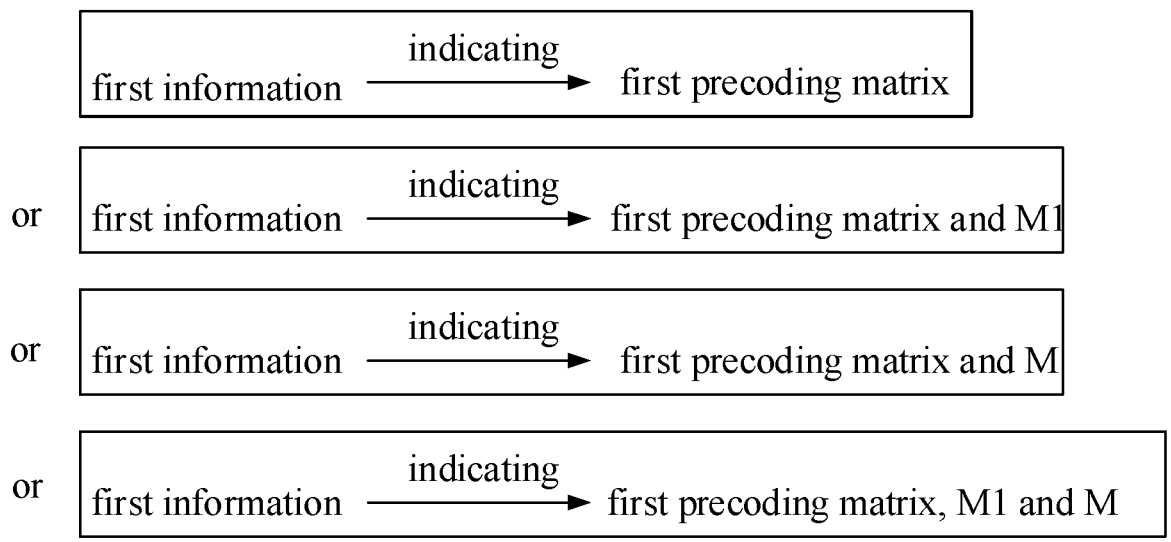
FIG. 14 illustrates a schematic diagram of first information according to one embodiment of the present disclosure.

Embodiment 14 illustrates a schematic diagram of first information, as shown in FIG. 14.

In Embodiment 14, the first information is used for indicating the first precoding matrix in the present disclosure.

In one embodiment, the first information is used for indicating the M1.

In one subembodiment, the first information comprises a first field and a second field, between which the first field indicates the first precoding matrix and the second field indicates the M1.

In one subembodiment, the first information comprises a first field, and the first field indicates the first precoding matrix and the M1.

In one embodiment, the first information is used for indicating the M.

In one subembodiment, the first information comprises a first field and a third field, between which the first field indicates the first precoding matrix and the third field indicates the M.

In one subembodiment, the first information comprises a first field, and the first field indicates the first precoding matrix and the M.

In one embodiment, the first information is used for indicating the M1 and the M.

In one subembodiment, the first information comprises a first field, a second field and a third field, among which the first field indicates the first precoding matrix, the second field indicates the M1, and the third field indicates the M.

In one subembodiment, the first information comprises a first field and a third field, between which the first field indicates the first precoding matrix and the M1, while the third field indicates the M.

In one subembodiment, the first information comprises a first field, and the first field indicates the first precoding matrix, the M1 and the M.

Embodiment 15

Figure 15:
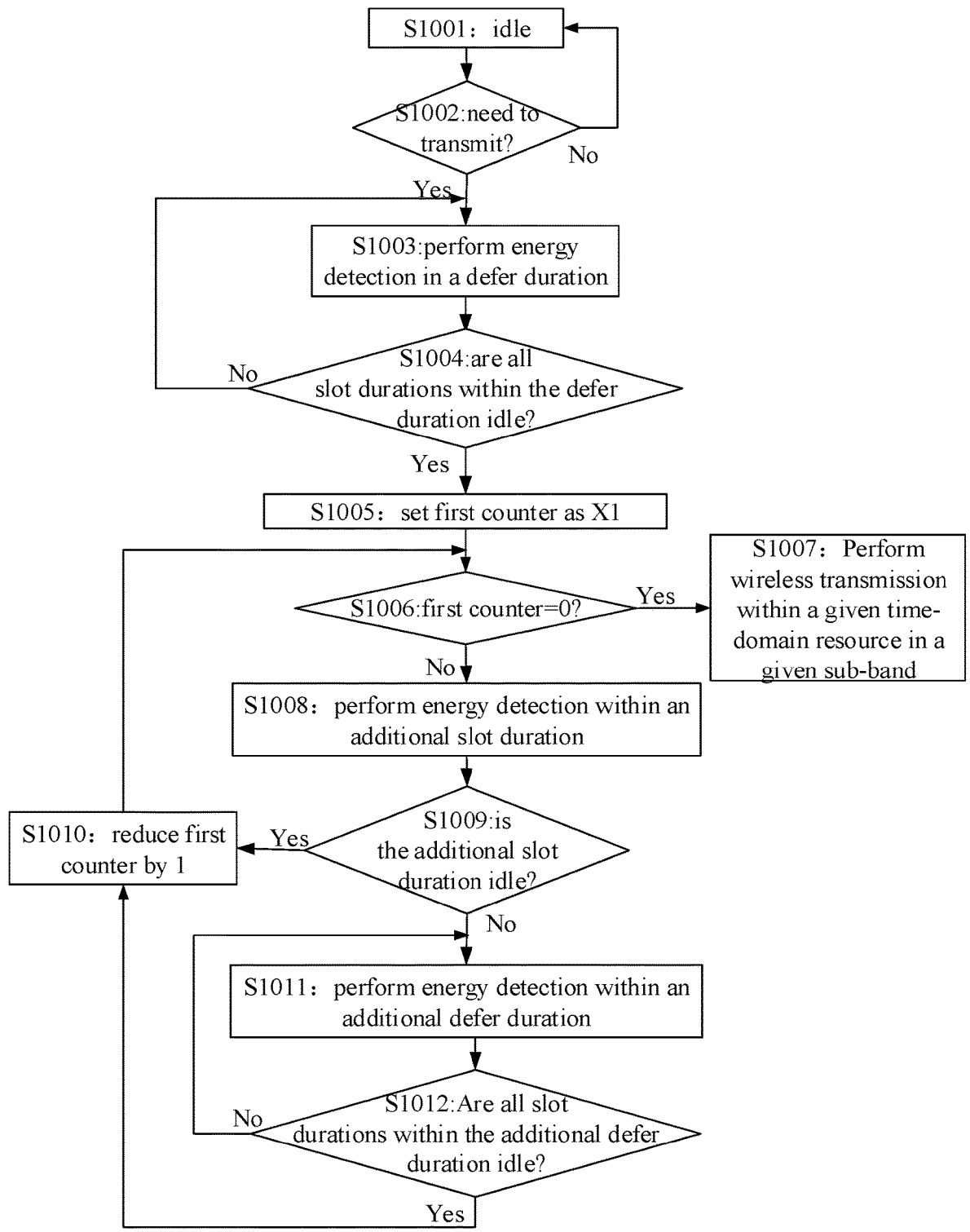
FIG. 15 illustrates a schematic diagram of a given access detection being used for determining whether wireless transmission is performed within a given time-domain resource in a given sub-band according to one embodiment of the present disclosure.

Embodiment 15 illustrates a schematic diagram of a given access detection being used for determining whether wireless transmission is performed within a given time-domain resource in a given sub-band; as shown in FIG. 15.

In Embodiment 15, the given access detection comprises performing X energy detection(s) respectively in X time sub-pool(s) on the given sub-band, through which X detection value(s) is(are) obtained, X being a positive integer; an end time of the X time sub-pool(s) is no later than a given time, and the given time is a start time of a given time-domain resource in the given sub-band. The given access detection corresponds to the first access detection in the present disclosure, the given sub-band corresponds to the first sub-band in the present disclosure, and a given time-domain resource in the given sub-band corresponds to a first time-domain resource in the first sub-band in the present disclosure, the X corresponds to the Q in the present disclosure, and X1 corresponds to the Q1 in the present disclosure; or, the given access detection corresponds to the second access detection in the present disclosure, the given sub-band corresponds to the second sub-band in the present disclosure, and a given time-domain resource in the given sub-band corresponds to a second time-domain resource in the second sub-band in the present disclosure, the X corresponds to the P in the present disclosure, and X1 corresponds to the P1 in the present disclosure; or, the given access detection corresponds to any of the K1 access detection(s), the given sub-band corresponds to the first sub-band in the present disclosure, and a given time-domain resource in the given sub-band corresponds to a first time-domain resource in the first sub-band in the present disclosure. The process of the given access detection may be depicted by the flowchart in FIG. 15.

In FIG. 15, the base station in the present disclosure is idle in step S1001; and determines whether there is need to transmit in step S1002; performs energy detection in a defer duration in step S1003; and determines in step S1004 whether all slot durations within the defer duration are idle, if yes, move forward to step S1005 to set a first counter as X1, the X1 being an integer no greater than the X; otherwise, go back to step S1004; the base station determines whether the first counter is 0 in step S1006, if yes, move forward to step S1007 to perform wireless transmission within a given time-domain resource in the given sub-band; otherwise, move forward to step S1008 to perform energy detection in an additional slot duration; and determines in step S1009 whether the additional slot duration is idle, if yes, move forward to step S1010 to reduce the first counter by 1 and then go back to step S1006; otherwise, move forward to step S1011 to perform energy detection in an additional defer duration; and determines in step S1012 whether all slot durations within the additional defer duration are idle, if yes, move back to step S1010; otherwise go back to step S1011.

In Embodiment 15, the first counter illustrated by FIG. 15 is cleared to 0 previous to the given time, and a result of the given access detection shows that the channel is idle, so wireless transmission can be performed within a given time-domain resource in the given sub-band; otherwise, wireless transmission within the given time-domain resource in the given sub-band is dropped. The condition for clearing the first counter is that each of X1 detection value(s) of the X detection value(s) respectively corresponding to X1 of the X time sub-pool(s) is lower than the first reference threshold in the present disclosure, a start time of the X1 time sub-pool(s) following the step S1005 in FIG. 15.

In one embodiment, the X time sub-pool(s) comprises (comprise) all defer durations in FIG. 15.

In one embodiment, the X time sub-pool(s) comprises (comprise) part of defer durations in FIG. 15.

In one embodiment, the X time sub-pool(s) comprises (comprise) all defer durations and all additional slot durations in FIG. 15.

In one embodiment, the X time sub-pool(s) comprises (comprise) all defer durations and part of additional slot durations in FIG. 15.

In one embodiment, the X time sub-pool(s) comprises (comprise) all defer durations, all additional slot durations and all additional defer durations in FIG. 15.

In one embodiment, the X time sub-pool(s) comprises (comprise) all defer durations, part of additional slot durations and all additional defer durations in FIG. 15.

In one embodiment, the X time sub-pool(s) comprises (comprise) all defer durations, part of additional slot durations and part of additional defer durations in FIG. 15.

In one embodiment, any of the X time sub-pool(s) lasts either 16 µs or 9 µs.

In one embodiment, any slot duration within a given time duration is one of the X time sub-pool(s); the given time duration is any duration out of all defer durations, all additional slot durations and all additional defer durations comprised in FIG. 15.

In one embodiment, performing energy detection within a given time duration refers to performing energy detection in all slot durations within the given time duration; the given time duration is any duration out of all defer durations, all additional slot durations and all additional defer durations comprised in FIG. 15.

In one embodiment, a given time duration being determined as idle through energy detection means that all slot durations within the given time duration are determined to be idle through energy detection; the given time duration is any duration out of all defer durations, all additional slot durations and all additional defer durations comprised in FIG. 15.

In one embodiment, a given slot duration being determined as idle through energy detection means that the base station senses power of all radio signals in a given time unit on the given sub-band and then averages in time, from which a received power obtained is lower than the first reference threshold; the given time unit is a consecutive duration in the given slot duration.

In one subembodiment, the given time unit lasts no shorter than 4 µs.

In one embodiment, a given slot duration being determined as idle through energy detection means that the base station senses energy of all radio signals in a given time unit on the given sub-band and then averages in time, from which a received energy obtained is lower than the first reference threshold; the given time unit is a consecutive duration in the given slot duration.

In one subembodiment, the given time unit lasts no shorter than 4 µs.

In one embodiment, performing energy detection in a given time duration refers to performing energy detection in time sub-pool(s) within the given time duration; the given time duration is any duration out of all defer durations, all additional slot durations and all additional defer durations comprised in FIG. 15, and each of the time sub-pool(s) belongs to the X time sub-pool(s).

In one embodiment, a given time duration being determined as idle through energy detection means that each of detection value(s) obtained through energy detection on time sub-pool(s) comprised by the given time duration is lower than the first reference threshold; the given time duration is any duration out of all defer durations, all additional slot durations and all additional defer durations comprised in FIG. 15, each of the time sub-pool(s) belongs to the X time sub-pool(s), and each of the detection value(s) is one of the X detection value(s).

In one embodiment, a defer duration lasts as long as $(16+Y1*9)$ µs, Y1 being a positive integer.

In one subembodiment, a defer duration comprises Y1+1 time sub-pools of the X time sub-pools.

In one reference embodiment of the above subembodiment, a first time sub-pool of the Y1+1 time sub-pools lasts 16 µs, while any of the other Y1 time sub-pool(s) lasts 9 µs.

In one subembodiment, the given priority class is used for determining the Y1.

In one reference embodiment of the above subembodiment, the given priority class refers to a Channel Access Priority Class, for the definition of the Channel Access Priority Class, refer to 3GPP TS36.213, section 15.

In one subembodiment, the Y1 is one of 1, 2, 3 and 7.

In one embodiment, a defer duration comprises multiple slot durations.

In one subembodiment, of the multiple slot durations a first slot duration and a second slot duration are non-consecutive.

In one subembodiment, of the multiple slot durations a first slot duration and a second slot duration are spaced by a time interval of 7 ms.

In one embodiment, an additional defer duration lasts $(16+Y2*9)$ µs, Y2 being a positive integer.

In one subembodiment, an additional defer duration comprises Y2+1 time sub-pools of the X time sub-pools.

In one reference embodiment of the above subembodiment, a first time sub-pool of the Y2+1 time sub-pools lasts 16 µs, while any of the other Y2 time sub-pool(s) lasts 9 µs.

In one subembodiment, the given priority class is used for determining the Y2.

In one subembodiment, the Y2 is one of 1, 2, 3 and 7.

In one embodiment, a defer duration lasts as long as an additional defer duration.

In one embodiment, the Y1 is equal to the Y2.

In one embodiment, an additional defer duration comprises multiple slot durations.

In one subembodiment, of the multiple slot durations a first slot duration and a second slot duration are non-consecutive.

In one subembodiment, of the multiple slot durations a first slot duration and a second slot duration are spaced by a time interval of 7 ms.

In one embodiment, a slot duration lasts 9 μs.

In one embodiment, a slot duration is one of the X time sub-pool(s).

In one embodiment, an additional slot duration lasts 9 μs.

In one embodiment, an additional slot duration comprises one of the X time sub-pool(s).

In one embodiment, the X energy detection(s) is(are) used for determining whether the given sub-band is idle.

In one embodiment, the X energy detection(s) is(are) used for determining whether the given sub-band can be used by the base station for transmitting a radio signal.

In one embodiment, the X energy detection(s) is(are) measured by dBm.

In one embodiment, the X energy detection(s) is(are) measured by mW.

In one embodiment, the X energy detection(s) is(are) measured by Joule (J).

In one embodiment, the X1 is less than the X.

In one embodiment, the X is greater than 1.

In one embodiment, the first reference threshold is measured by dBm.

In one embodiment, the first reference threshold is measured by mW.

In one embodiment, the first reference threshold is measured by Joule (J).

In one embodiment, the first reference threshold is equal to or less than −72 dBm.

In one embodiment, the first reference threshold is equal to or less than any value of a first given value.

In one subembodiment, the first given value is predefined.

In one subembodiment, the first given value is configured by a higher-layer signaling.

In one subembodiment, the first reference threshold is liberally selected by the base station given that the first reference threshold is equal to or less than a first given value.

In one subembodiment, the first given value is predefined.

In one subembodiment, the first given value is configured by a higher-layer signaling.

In one embodiment, the X energy detection(s) is(are) energy detection(s) in a process of Cat 4 Listen Before Talk (LBT), and the X1 is CWp in the Cat 4 LBT, the CWp referring to contention window size, and the detailed definition of the CWp found in 3GPP TS36.213, section 15.

In one embodiment, at least one of the X detection values not belonging to the X1 detection value(s) is lower than the first reference threshold.

In one embodiment, at least one of the X detection values not belonging to the X1 detection value(s) is no lower than the first reference threshold.

In one embodiment, any two of the X1 time sub-pools are of equal duration.

In one embodiment, at least two of the X1 time sub-pools are of unequal duration.

In one embodiment, the X1 time sub-pool(s) comprises (comprise) a latest time sub-pool of the X time sub-pools.

In one embodiment, the X1 time sub-pool(s) comprises (comprise) only slot durations in an enhanced Clear Channel Assessment (eCCA).

In one embodiment, the X time sub-pools comprise the X1 time sub-pool(s) and X2 time sub-pool(s), any of the X2 time sub-pool(s) not belonging to the X1 time sub-pool(s); X2 is a positive integer no greater than the X minus the X1.

In one subembodiment, the X2 time sub-pool(s) comprises(comprise) slot durations in an initial CCA.

In one subembodiment, positions of the X2 time sub-pools among the X time sub-pools are consecutive.

In one subembodiment, at least one of the X2 time sub-pool(s) corresponds to a detection value lower than the first reference threshold.

In one subembodiment, at least one of the X2 time sub-pool(s) corresponds to a detection value not lower than the first reference threshold.

In one subembodiment, the X2 time sub-pool(s) comprises(comprise) all slot durations within all defer durations.

In one subembodiment, the X2 time sub-pool(s) comprises(comprise) all slot durations within at least one additional defer duration.

In one subembodiment, the X2 time sub-pool(s) comprises(comprise) at least one additional slot duration.

In one subembodiment, the X2 time sub-pool(s) comprises(comprise) all slot durations comprised in all additional slot durations and all additional defer durations in FIG. 15 determined to be non-idle through energy detection.

In one embodiment, the X1 time sub-pool(s) respectively belongs(belong) to X1 sub-pool set(s), and any of the X1 sub-pool set(s) comprises a positive integer number of time sub-pool(s) of the X time sub-pool(s); any time sub-pool comprised by the X1 sub-pool set(s) corresponds to a detection value lower than the first reference threshold.

In one subembodiment, at least one of the X1 sub-pool set(s) comprises one time sub-pool.

In one subembodiment, at least one of the X1 sub-pool set(s) comprises more than one time sub-pool.

In one subembodiment, at least two of the X1 sub-pool sets comprise unequal numbers of time sub-pools.

In one subembodiment, none of the X time sub-pools belongs to two sub-pool sets of the X1 sub-pool sets at the same time.

In one subembodiment, time sub-pools comprised in any of the X1 sub-pool set(s) belong to a same additional defer duration or additional slot duration determined as idle through energy detection.

In one subembodiment, at least a time sub-pool of the X time sub-pools not belonging to the X1 sub-pool set(s) corresponds to a detection value lower than the first reference threshold.

In one subembodiment, at least a time sub-pool of the X time sub-pools not belonging to the X1 sub-pool set(s) corresponds to a detection value no lower than the first reference threshold.

Embodiment 16

Figure 16:
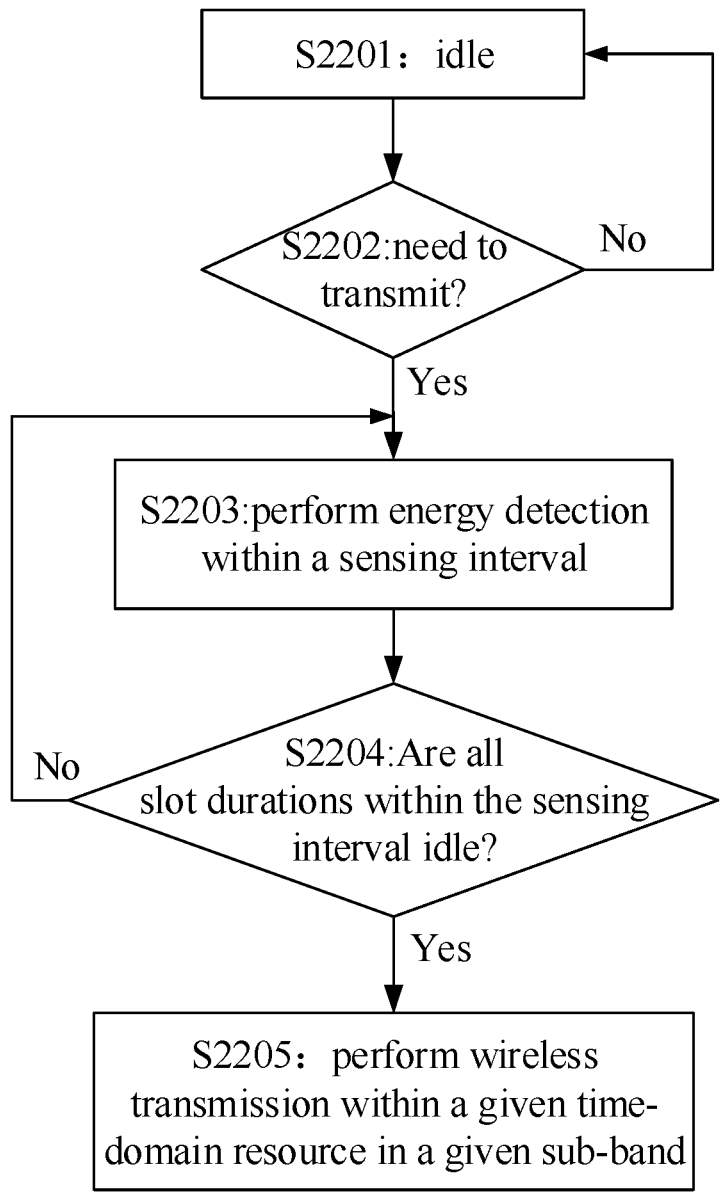
FIG. 16 illustrates a schematic diagram of a given access detection being used for determining whether wireless transmission is performed within a given time-domain resource in a given sub-band according to another embodiment of the present disclosure.
Figure 17A:
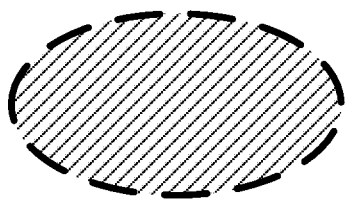
FIG. 17 A-FIG. 17B respectively illustrate a schematic diagram of a given antenna port group being spatially correlated with a given energy detection according to one embodiment of the present disclosure.
Figure 17A:
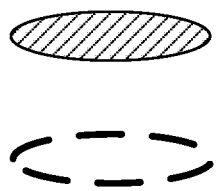
Figure 17B:
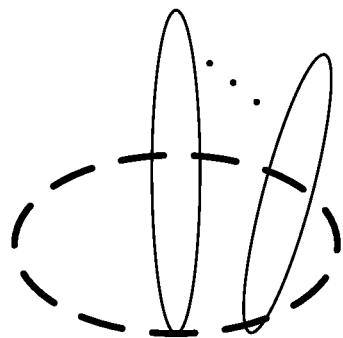
Figure 17B:
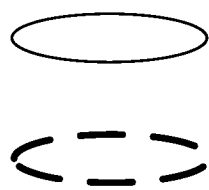

Embodiment 16 illustrates another schematic diagram of a given access detection being used for determining whether wireless transmission is performed within a given time-domain resource in a given sub-band; as shown in FIG. 16.

In Embodiment 16, the given access detection comprises performing X energy detection(s) respectively in X time sub-pool(s) on the given sub-band, through which X detection value(s) is(are) obtained, X being a positive integer; an end time of the X time sub-pool(s) is no later than a given time, and the given time is a start time of a given time-domain resource in the given sub-band. The given access detection corresponds to the first access detection in the present disclosure, the given sub-band corresponds to the first sub-band in the present disclosure, and a given time-domain resource in the given sub-band corresponds to a first time-domain resource in the first sub-band in the present disclosure, the X corresponds to the Q in the present disclosure, and X1 corresponds to the Q1 in the present disclosure; or, the given access detection corresponds to the second access detection in the present disclosure, the given sub-band corresponds to the second sub-band in the present disclosure, and a given time-domain resource in the given sub-band corresponds to a second time-domain resource in the second sub-band in the present disclosure, the X corresponds to the P in the present disclosure, and X1 corresponds to the P1 in the present disclosure; or, the given access detection corresponds to any of the K1 access detection(s), the given sub-band corresponds to the first sub-band in the present disclosure, and a given time-domain resource in the given sub-band corresponds to a first time-domain resource in the first sub-band in the present disclosure. The process of the given access detection may be depicted by the flowchart in FIG. 16.

In Embodiment 16, the UE in the present disclosure is idle in step S2201, and determines whether there is need to transmit in step S2202; performs energy detection in a sensing interval in step S2203; and determines in step S2204 whether all slot durations within the sensing interval are idle, if yes, move forward to step S2205 to perform wireless transmission within a given time-domain resource in the given sub-band; otherwise, go back to step S2203.

In Embodiment 16, a first given duration comprises a positive integer number of time sub-pool(s) of the X time sub-pool(s), and the first given duration is any duration in all sensing intervals comprised in FIG. 16. A second given duration comprises one of the X1 time sub-pool(s), and the second given duration is a sensing interval in FIG. 16 determined to be idle through energy detection.

In one embodiment, the detailed definition of the sensing interval can be found in 3GPP TS36.213, section 15.2.

In one embodiment, the X1 is equal to 2.

In one embodiment, the X1 is equal to the X.

In one embodiment, a sensing interval lasts 25 μs.

In one embodiment, a sensing interval comprises 2 slot durations, the 2 slot durations being non-consecutive in time domain.

In one subembodiment, a time interval between the 2 slot durations is 7 μs.

In one embodiment, the X time sub-pool(s) comprises (comprise) listening time in Category 2 LBT.

In one embodiment, the X time sub-pool(s) comprises (comprise) slots comprised in a sensing interval in Type 2 UL channel access procedure, for the detailed definition of the sensing interval, refer to 3GPP TS36.213, section 15.2.

In one subembodiment, the sensing interval lasts 25 μs.

In one embodiment, the X time sub-pool(s) comprises (comprise) a Tf and a Tsl comprised in a sensing interval in Type 2 UL channel access procedure, for the detailed definition of the Tf and the Tsl, refer to 3GPP TS36.213, section 15.2.

In one subembodiment, the Tf lasts 16 μs.

In one subembodiment, the Tsl lasts 9 μs.

In one embodiment, a first time sub-pool of the X1 time sub-pools lasts 16 μs, while a second time sub-pool of the X1 time sub-pools lasts 9 μs, the X1 being 2.

In one embodiment, each of the X1 time sub-pools lasts 9 μs; and a time interval between a first time sub-pool and a second time sub-pool of the X1 time sub-pools is 7 μs, the X1 being 2.

Embodiment 17

Embodiment 17 A-Embodiment 17B respectively illustrate a schematic diagram of a given antenna port group being spatially correlated with a given energy detection, as shown in FIG. 17.

In Embodiment 17, the given antenna port group corresponds to the first antenna port group in the present disclosure, and the given energy detection corresponds to any of the Q energy detection(s) comprised by the first access detection in the present disclosure; or, the given antenna port group corresponds to the M2 antenna port(s) in the present disclosure, and the given energy detection corresponds to any of the P energy detection(s) comprised by the second access detection in the present disclosure In one embodiment, the phrase that a given antenna port group is spatially correlated to a given energy detection means that multi-antenna reception employed by the given energy detection can be used to infer multi-antenna transmission of the given antenna port group, or multi-antenna transmission of the given antenna port group can be used to infer multi-antenna reception employed by the given energy detection.

In one embodiment, the phrase that a given antenna port group is spatially correlated to a given energy detection means that multi-antenna reception employed by the given energy detection is the same as multi-antenna related transmission of the given antenna port group.

In one embodiment, the phrase that a given antenna port group is spatially correlated to a given energy detection means that multi-antenna reception employed by the given energy detection comprises multi-antenna related transmission of the given antenna port group.

In one embodiment, the phrase that a given antenna port group is spatially correlated to a given energy detection means that a beam width for a reception beamforming matrix employed by the given energy detection is no smaller than a beam width for a transmission beamforming matrix of the given antenna port group.

In one embodiment, the phrase that a given antenna port group is spatially correlated to a given energy detection means that a beam direction corresponding to a reception beamforming matrix employed by the given energy detection includes a beam direction corresponding to a transmission beamforming matrix of the given antenna port group.

In one embodiment, the phrase that a given antenna port group is spatially correlated to a given energy detection means that a beam width for a reception beam employed by the given energy detection is larger than a beam width for a transmission beam of the given antenna port group.

In one embodiment, the phrase that a given antenna port group is spatially correlated to a given energy detection means that a reception beam employed by the given energy detection comprises a transmission beam of the given antenna port group.

In one embodiment, the phrase that a given antenna port group is not spatially correlated to a given energy detection means that multi-antenna reception employed by the given energy detection cannot be used to infer multi-antenna transmission of the given antenna port group, or multi-antenna transmission of the given antenna port group cannot be used to infer multi-antenna reception employed by the given energy detection.

In one embodiment, the phrase that a given antenna port group is not spatially correlated to a given energy detection means that multi-antenna reception employed by the given energy detection is different from multi-antenna related transmission of the given antenna port group.

In one embodiment, the phrase that a given antenna port group is not spatially correlated to a given energy detection means that multi-antenna reception employed by the given energy detection does not comprise multi-antenna related transmission of the given antenna port group.

In one embodiment, the phrase that a given antenna port group is not spatially correlated to a given energy detection means that a beam width for a reception beamforming matrix employed by the given energy detection is smaller than a beam width for a transmission beamforming matrix of the given antenna port group.

In one embodiment, the phrase that a given antenna port group is not spatially correlated to a given energy detection means that a beam direction corresponding to a reception beamforming matrix employed by the given energy detection does not include a beam direction corresponding to a transmission beamforming matrix of the given antenna port group.

In one embodiment, the phrase that a given antenna port group is not spatially correlated to a given energy detection means that a beam width for a reception beam employed by the given energy detection is smaller than a beam width for a transmission beam of the given antenna port group.

In one embodiment, the phrase that a given antenna port group is not spatially correlated to a given energy detection means that a reception beam employed by the given energy detection does not include a transmission beam of the given antenna port group.

In one embodiment, a quantity of antennas employed by the given energy detection is smaller than that of transmission antennas of the given antenna port group.

In one embodiment, the multi-antenna reception refers to Spatial Rx parameters.

In one embodiment, the multi-antenna reception refers to a reception beam.

In one embodiment, the multi-antenna reception refers to a reception beamforming matrix.

In one embodiment, the multi-antenna reception refers to a reception analog beamforming matrix.

In one embodiment, the multi-antenna reception refers to a reception beamforming vector.

In one embodiment, the multi-antenna reception refers to a Rx spatial filtering.

In one embodiment, the multi-antenna transmission refers to Spatial Tx parameters.

In one embodiment, the multi-antenna transmission refers to a transmission beam.

In one embodiment, the multi-antenna transmission refers to a transmission beamforming matrix.

In one embodiment, the multi-antenna transmission refers to a transmission analog beamforming matrix.

In one embodiment, the multi-antenna transmission refers to a transmission beamforming vector.

In one embodiment, the multi-antenna transmission refers to a Tx spatial filtering.

In one embodiment, a quantity of antennas employed by the given energy detection is greater than 1.

In one embodiment, a quantity of transmission antennas of the given antenna port group is greater than 1.

In one embodiment, the Embodiment 17A corresponds to a schematic diagram of the given antenna port group being spatially correlated with the given energy detection, where a reception beam employed by the given energy detection is the same as a transmission beam of the given antenna port group.

In one embodiment, the Embodiment 17A corresponds to a schematic diagram of the given antenna port group being spatially correlated with the given energy detection, where a reception beam employed by the given energy detection comprises a transmission beam of the given antenna port group.

Embodiment 18

Figure 18:
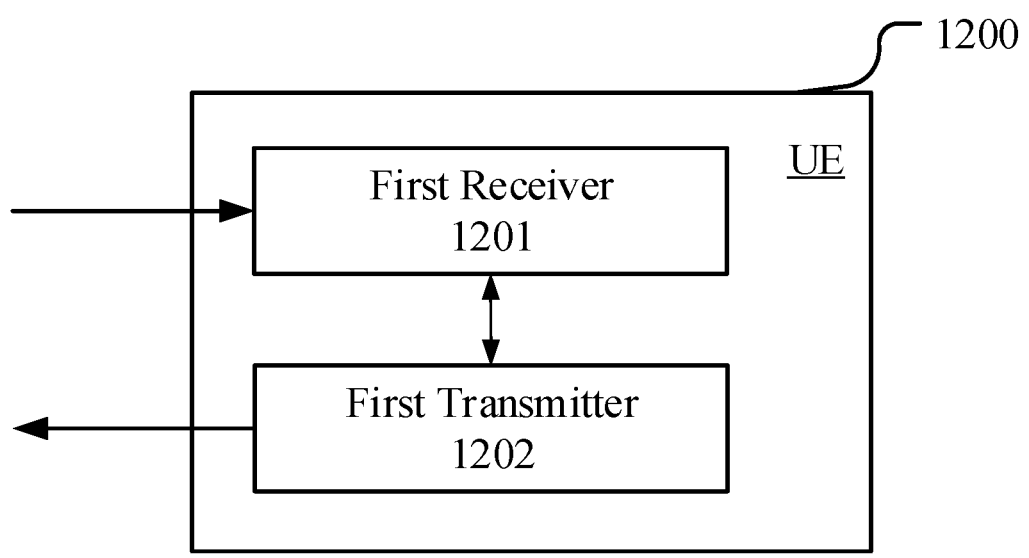
FIG. 18 illustrates a structure block diagram of a processing device in a UE according to one embodiment of the present disclosure.

Embodiment 18 illustrates a structure block diagram of a processing device in a UE, as shown in FIG. 18. In FIG. 18, a UE's processing device 1200 comprises a first receiver 1201 and a first transmitter 1202.

In one embodiment, the first receiver 1201 comprises the receiver 456, the receiving processor 452 and the controller/processor 490 in Embodiment 4.

In one embodiment, the first receiver 1201 comprises at least the first two of the receiver 456, the receiving processor 452 and the controller/processor 490 in Embodiment 4.

In one embodiment, the first transmitter 1202 comprises the transmitter 456, the transmitting processor 455 and the controller/processor 490 in Embodiment 4.

In one embodiment, the first transmitter 1202 comprises at least the first two of the transmitter 456, the transmitting processor 455 and the controller/processor 490 in Embodiment 4.

The first receiver 1201 receives first information, the first information being used for indicating a first precoding matrix.

The first transmitter 1202 transmits a first radio signal through a first antenna port group within a first time-domain resource in a first sub-band, or, drops wireless transmission through a first antenna port within a first time-domain resource in a first sub-band.

In Embodiment 18, the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

In one embodiment, the first precoding matrix is for M1 antenna ports, while each of the K transmission parameter groups is for M antenna ports, M being a positive integer greater than 1, and M1 being a positive integer greater than 1, and the M1 is no greater than the M.

In one embodiment, the first receiver 1201 also performs K1 access detection(s) on the first sub-band, K1 being a positive integer no greater than the K; herein, K1 transmission parameter group(s) of the K transmission parameter groups is(are) respectively used for the K1 access detection(s), and the first transmission parameter group is one of the K1 transmission parameter group(s); the K1 access detection(s) is(are) respectively used for determining whether wireless transmission can be performed via a corresponding transmission parameter group within a first time-domain resource in the first sub-band.

In one embodiment, the UE transmits the first radio signal through the first antenna port group within a first time-domain resource in the first sub-band; the K1 is greater than 1, the K1 access detections being used for determining the first transmission parameter group out of the K1 transmission parameter groups.

In one embodiment, the UE drops wireless transmission through a first antenna port group within a first time-domain resource in the first sub-band; the K1 is equal to the K, and each of the K1 access detections indicates that wireless transmission cannot be performed through a corresponding transmission parameter group within the first time-domain resource in the first sub-band.

In one embodiment, the UE autonomously determines the K transmission parameter groups based on the first precoding matrix.

In one embodiment, the first precoding matrix corresponds to K precoding matrixes, and the K precoding matrixes are used for determining the K transmission parameter groups, the K precoding matrixes being pre-defined or configurable.

In one embodiment, the first receiver 1201 also receives second information; and transmits a first reference signal through M2 antenna port(s); herein, the second information is used for indicating a time-domain resource occupied by the first reference signal, the first reference signal being used for determining the first precoding matrix, M2 being a positive integer no greater than the M.

In one embodiment, the first receiver 1201 also receives third information; herein the third information is used for indicating configuration information of the first radio signal.

Embodiment 19

Figure 19:
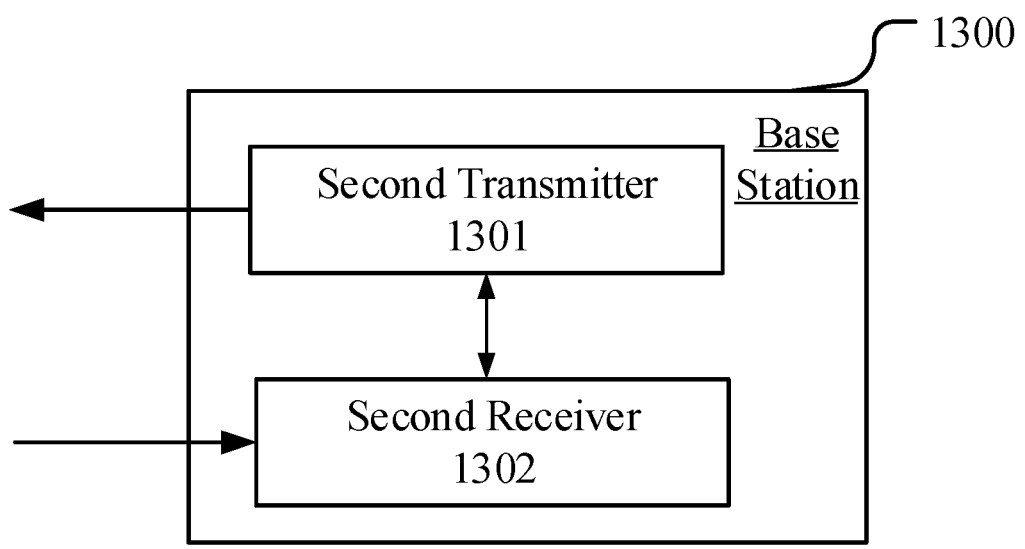
FIG. 19 illustrates a structure block diagram of a processing device in a base station according to one embodiment of the present disclosure.

Embodiment 19 illustrates a structure block diagram of a processing device in a base station, as shown in FIG. 19. In FIG. 19, a base station's processing device 1300 comprises a second transmitter 1301 and a second receiver 1302.

In one subembodiment, the second transmitter 1301 comprises the transmitter 416, the transmitting processor 415 and the controller/processor 440 in Embodiment 4.

In one subembodiment, the second transmitter 1301 comprises at least the first two of the transmitter 416, the transmitting processor 415 and the controller/processor 440 in Embodiment 4.

In one subembodiment, the second receiver 1302 comprises the receiver 416, the receiving processor 412 and the controller/processor 440 in Embodiment 4.

In one subembodiment, the second receiver 1302 comprises at least the first two of the receiver 416, the receiving processor 412 and the controller/processor 440 in Embodiment 4.

The second transmitter 1301 transmits first information, the first information being used for indicating a first precoding matrix.

The second receiver 1302 monitors whether a first radio signal is transmitted within a first time-domain resource in a first sub-band; if yes, the first radio signal is received through a first antenna port group within a first time-domain resource in the first sub-band.

In Embodiment 19, the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

In one embodiment, the first precoding matrix is for M1 antenna ports, while each of the K transmission parameter groups is for M antenna ports, M being a positive integer greater than 1, and M1 being a positive integer greater than 1, and the M1 is no greater than the M.

In one embodiment, a receiver of the first information performs K1 access detection(s) on the first sub-band, K1 being a positive integer no greater than the K; herein, K1 transmission parameter group(s) of the K transmission parameter groups is(are) respectively used for the K1 access detection(s), and the first transmission parameter group is one of the K1 transmission parameter group(s); the K1 access detection(s) is(are) respectively used for determining whether wireless transmission can be performed via a corresponding transmission parameter group within a first time-domain resource in the first sub-band.

In one embodiment, a receiver of the first information transmits the first radio signal through the first antenna port group within a first time-domain resource in the first sub-band; the K1 is greater than 1, the K1 access detections being used for determining the first transmission parameter group out of the K1 transmission parameter groups.

In one embodiment, a receiver of the first information drops wireless transmission through a first antenna port group within a first time-domain resource in the first sub-band; the K1 is equal to the K, and each of the K1 access detections indicates that wireless transmission cannot be performed through a corresponding transmission parameter group within the first time-domain resource in the first sub-band.

In one embodiment, a receiver of the first information autonomously determines the K transmission parameter groups based on the first precoding matrix.

In one embodiment, the first precoding matrix corresponds to K precoding matrixes, and the K precoding matrixes are used for determining the K transmission parameter groups, the K precoding matrixes being pre-defined or configurable.

In one embodiment, the second transmitter 1301 also transmits second information; and receives a first reference signal through M2 antenna port(s); herein, the second information is used for indicating a time-domain resource occupied by the first reference signal, the first reference signal being used for determining the first precoding matrix, M2 being a positive integer no greater than the M.

In one embodiment, the second transmitter 1301 also transmits third information; herein the third information is used for indicating configuration information of the first radio signal.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communications, comprising:
   receiving first information, the first information being used for indicating a first precoding matrix;
   transmitting a first radio signal through a first antenna port group within a first time-domain resource in a first sub-band, or, dropping wireless transmission through a first antenna port group within a first time-domain resource in a first sub-band;
   wherein the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

2. The method according to claim 1, wherein the first precoding matrix is for M1 antenna ports, while each of the K transmission parameter groups is for M antenna ports, M being a positive integer greater than 1, and M1 being a positive integer greater than 1, and the M1 is no greater than the M.

3. The method according to claim 1, comprising:
   performing K1 access detection(s) on the first sub-band, K1 being a positive integer no greater than the K;
   wherein K1 transmission parameter group(s) of the K transmission parameter groups is(are) respectively used for the K1 access detection(s), and the first transmission parameter group is one of the K1 transmission parameter group(s); the K1 access detection(s) is(are) respectively used for determining whether wireless transmission can be performed via a corresponding transmission parameter group within a first time-domain resource in the first sub-band.

4. The method according to claim 3, wherein when the UE transmits the first radio signal through the first antenna port group within the first time-domain resource in the first sub-band, the K1 is greater than 1, and the K1 access detections are used for determining the first transmission parameter group out of the K1 transmission parameter groups; when the UE drops wireless transmission through the first antenna port group within the first time-domain resource in the first sub-band, the K1 is equal to the K, and each of the K1 access detections indicates that wireless transmission cannot be performed through a corresponding transmission parameter group within the first time-domain resource in the first sub-band.

5. The method according to claim 1, wherein the UE autonomously determines the K transmission parameter groups based on the first precoding matrix; or, the first precoding matrix corresponds to K precoding matrixes, and the K precoding matrixes are used for determining the K transmission parameter groups, the K precoding matrixes being pre-defined or configurable.

6. The method according to claim 1, wherein the first precoding matrix corresponds to K precoding matrixes, the K precoding matrixes being pre-defined or configurable; among the first precoding matrix and the K precoding matrixes only the K precoding matrixes are used for determining the K transmission parameter groups, the K transmission parameter groups being respectively generated by the K precoding matrixes; or, the K transmission parameter groups are respectively generated jointly by the K precoding matrixes and the first precoding matrix.

7. The method according to claim 1, comprising:
   receiving second information; and transmitting a first reference signal through M2 antenna port(s); wherein the second information is used for indicating a time-domain resource occupied by the first reference signal, the first reference signal being used for determining the first precoding matrix, M2 being a positive integer no greater than the M;
   or, receiving third information; wherein the third information is used for indicating configuration information of the first radio signal.

8. A base station for wireless communications, comprising:
   a second transmitter, which transmits first information, the first information being used for indicating a first precoding matrix; and
   a second receiver, which monitors whether a first radio signal is transmitted within a first time-domain resource in a first sub-band; if yes, the second receiver receives the first radio signal through a first antenna port group within the first time-domain resource in the first sub-band;
   wherein the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

9. The base station according to claim 8, wherein the first precoding matrix is for M1 antenna ports, while each of the K transmission parameter groups is for M antenna ports, M being a positive integer greater than 1, and M1 being a positive integer greater than 1, and the M1 is no greater than the M.

10. The base station according to claim 8, wherein a receiver of the first information performs K1 access detection(s) on the first sub-band, K1 being a positive integer no greater than the K; K1 transmission parameter group(s) of the K transmission parameter groups is(are) respectively used for the K1 access detection(s), and the first transmission parameter group is one of the K1 transmission parameter group(s); the K1 access detection(s) is(are) respectively used for determining whether wireless transmission can be performed via a corresponding transmission parameter group within a first time-domain resource in the first sub-band.

11. The base station according to claim 8, wherein a receiver of the first information autonomously determines the K transmission parameter groups based on the first precoding matrix; or, the first precoding matrix corresponds to K precoding matrixes, and the K precoding matrixes are used for determining the K transmission parameter groups, the K precoding matrixes being pre-defined or configurable.

12. The base station according to claim 8, wherein the first precoding matrix corresponds to K precoding matrixes, the K precoding matrixes being pre-defined or configurable; among the first precoding matrix and the K precoding matrixes only the K precoding matrixes are used for determining the K transmission parameter groups, the K transmission parameter groups being respectively generated by the K precoding matrixes; or, the K transmission parameter groups are respectively generated jointly by the K precoding matrixes and the first precoding matrix.

13. The base station according to claim 8, wherein the second transmitter also transmits second information; and receives a first reference signal through M2 antenna port(s);

wherein the second information is used for indicating a time-domain resource occupied by the first reference signal, the first reference signal being used for determining the first precoding matrix, M2 being a positive integer no greater than the M;

or, the second transmitter also transmits third information; wherein the third information is used for indicating configuration information of the first radio signal.

14. A User Equipment (UE) for wireless communications, comprising:
a first receiver, which receives first information, the first information being used for indicating a first precoding matrix; and
a first transmitter, which transmits a first radio signal through a first antenna port group within a first time-domain resource in a first sub-band, or, which drops wireless transmission through a first antenna port group within a first time-domain resource in a first sub-band;
wherein the first precoding matrix is used for determining K transmission parameter groups, K being a positive integer greater than 1; a first transmission parameter group is one of the K transmission parameter groups, and the first transmission parameter group is used for generating the first antenna port group, the first antenna port group comprising a positive integer number of antenna port(s).

15. The UE according to claim 14, wherein the first precoding matrix is for M1 antenna ports, while each of the K transmission parameter groups is for M antenna ports, M being a positive integer greater than 1, and M1 being a positive integer greater than 1, and the M1 is no greater than the M.

16. The UE according to claim 14, wherein the first receiver performs K1 access detection(s) on the first sub-band, K1 being a positive integer no greater than the K; wherein K1 transmission parameter group(s) of the K transmission parameter groups is(are) respectively used for the K1 access detection(s), and the first transmission parameter group is one of the K1 transmission parameter group(s); the K1 access detection(s) is(are) respectively used for determining whether wireless transmission can be performed via a corresponding transmission parameter group within a first time-domain resource in the first sub-band.

17. The UE according to claim 16, wherein when the UE transmits the first radio signal through the first antenna port group within the first time-domain resource in the first sub-band, the K1 is greater than 1, and the K1 access detections are used for determining the first transmission parameter group out of the K1 transmission parameter groups; when the UE drops wireless transmission through the first antenna port group within the first time-domain resource in the first sub-band, the K1 is equal to the K, and each of the K1 access detections indicates that wireless transmission cannot be performed through a corresponding transmission parameter group within the first time-domain resource in the first sub-band.

18. The UE according to claim 14, wherein the UE autonomously determines the K transmission parameter groups based on the first precoding matrix; or, the first precoding matrix corresponds to K precoding matrixes, and the K precoding matrixes are used for determining the K transmission parameter groups, the K precoding matrixes being pre-defined or configurable.

19. The UE according to claim 14, wherein the first precoding matrix corresponds to K precoding matrixes, the K precoding matrixes being pre-defined or configurable; among the first precoding matrix and the K precoding matrixes only the K precoding matrixes are used for determining the K transmission parameter groups, the K transmission parameter groups being respectively generated by the K precoding matrixes; or, the K transmission parameter groups are respectively generated jointly by the K precoding matrixes and the first precoding matrix.

20. The UE according to claim 14, wherein the first receiver receives second information; and transmits a first reference signal through M2 antenna port(s); wherein the second information is used for indicating a time-domain resource occupied by the first reference signal, the first reference signal being used for determining the first precoding matrix, M2 being a positive integer no greater than the M;

or, the first receiver also receives third information; wherein the third information is used for indicating configuration information of the first radio signal.

* * * * *